(12) United States Patent
Yang et al.

(10) Patent No.: US 12,184,352 B2
(45) Date of Patent: Dec. 31, 2024

(54) ATMOSPHERIC DUCT INTERFERENCE ELIMAMATING SCHEME

(71) Applicant: Huawei Technologies Co., Ltd., Shenzhen (CN)

(72) Inventors: Yong Yang, Chengdu (CN); Mingyang Sun, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 593 days.

(21) Appl. No.: 17/514,850

(22) Filed: Oct. 29, 2021

(65) Prior Publication Data

US 2022/0052772 A1 Feb. 17, 2022

Related U.S. Application Data

(63) Continuation of application No. PCT/CN2020/087970, filed on Apr. 30, 2020.

(30) Foreign Application Priority Data

Apr. 30, 2019 (CN) .......................... 201910363600.7

(51) Int. Cl.
  *H04B 17/345* (2015.01)
  *H04B 1/10* (2006.01)
  *H04W 24/10* (2009.01)

(52) U.S. Cl.
  CPC ......... *H04B 17/345* (2015.01); *H04B 1/1009* (2013.01); *H04W 24/10* (2013.01)

(58) Field of Classification Search
  CPC ... H04B 17/345; H04B 1/1009; H04W 24/10; H04W 72/27; H04W 28/0236;
  (Continued)

(56) References Cited

U.S. PATENT DOCUMENTS 10,117,248 B1 10/2018 Wurtenberger et al.
11,617,144 B2 * 3/2023 Baldemair ........... H04J 11/0056
  370/336
(Continued)

FOREIGN PATENT DOCUMENTS

CN 101600241 A 12/2009
CN 102378260 A * 3/2012
(Continued)

OTHER PUBLICATIONS

Nokia, Nokia Shanghai Bell, "Considerations on identifying strong gNB interferers," 3GPP Draft, 3GPP TSG RAN WG1 Meeting #94bis, Chengdu, China, R1-1811212, Sep. 28, 2018, total 5 pages, XP051518613, 3rd Generation Partnership Project, Valbonne, France (Oct. 8-12, 2018).
(Continued)

*Primary Examiner* — Chi H Pham
*Assistant Examiner* — Vladislav Y Agureyev
(74) *Attorney, Agent, or Firm* — Leydig, Voit & Mayer, Ltd.

(57) ABSTRACT

A communication method and apparatus are disclosed. The method includes: after determining that a first base station is affected by atmospheric duct interference from a second base station, the first base station sends first information to the second base station through a core network, to notify the first base station that the first base station causes atmospheric duct interference to the second base station. After determining that the first base station is affected by the atmospheric duct interference from the second base station, the first base station notifies the second base station in a wired link manner, and may send the first information to the second base station through the core network.

14 Claims, 8 Drawing Sheets

(58) Field of Classification Search
CPC ............. H04W 28/0294; H04W 74/085; H04J 11/0023; H04J 11/0056; H04L 5/0062; H04L 5/0048
See application file for complete search history.

(56) References Cited

U.S. PATENT DOCUMENTS

| | | |
|---|---|---|
| 2010/0214939 A1 | 8/2010 | Ryan |
| 2012/0113843 A1 | 5/2012 | Watfa et al. |
| 2017/0264487 A1* | 9/2017 | Scahill .................... H04W 4/70 |
| 2018/0027471 A1* | 1/2018 | Zhang .................... H04W 92/20 455/436 |
| 2019/0140731 A1* | 5/2019 | Mohan ................ H04L 63/0428 |
| 2019/0261187 A1* | 8/2019 | Chen ..................... H04W 36/00 |
| 2020/0107227 A1 | 4/2020 | Xu et al. |
| 2020/0322963 A1* | 10/2020 | Li ........................ H04W 72/541 |
| 2021/0235463 A1* | 7/2021 | Xu ....................... H04J 13/0074 |
| 2021/0298103 A1* | 9/2021 | Yilmaz ................ H04W 24/10 |
| 2021/0321417 A1* | 10/2021 | Kim ....................... H04L 5/0048 |
| 2021/0352554 A1* | 11/2021 | Barac ................... H04J 11/0056 |
| 2021/0385035 A1* | 12/2021 | Ghozlan .................. H04L 5/14 |
| 2021/0385795 A1* | 12/2021 | Cao ................... H04W 72/0466 |
| 2021/0400676 A1* | 12/2021 | Faxer ................. H04W 72/0446 |
| 2021/0409177 A1* | 12/2021 | Hao ..................... H04B 17/345 |
| 2021/0410081 A1* | 12/2021 | Xu ........................ H04J 11/0056 |
| 2022/0046432 A1* | 2/2022 | Li ........................... H04W 24/02 |
| 2022/0103265 A1* | 3/2022 | Ghozlan .................. H04B 1/69 |
| 2022/0109536 A1* | 4/2022 | Ghozlan ............... H04W 24/10 |
| 2022/0131630 A1* | 4/2022 | Ghozlan ............... H04W 24/02 |
| 2022/0141694 A1* | 5/2022 | Miao .................... H04B 17/345 370/252 |
| 2022/0173819 A1* | 6/2022 | Liu ....................... H04L 5/0062 |
| 2023/0037317 A1* | 2/2023 | Kwak ............... H04W 52/0245 |

FOREIGN PATENT DOCUMENTS

| | | | |
|---|---|---|---|
| CN | 102860067 A | * 1/2013 | ........ H04W 36/0083 |
| CN | 103563477 A | 2/2014 | |
| CN | 103703704 A | 4/2014 | |
| CN | 105517044 A | 4/2016 | |
| CN | 105848164 A | 8/2016 | |
| CN | 107566441 A | 1/2018 | |
| CN | 108243508 A | 7/2018 | |
| CN | 108834111 A | 11/2018 | |
| CN | 110958074 A | 4/2020 | |
| CN | 110971312 A | 4/2020 | |
| WO | WO-2016192590 A1 | * 12/2016 | ............ H04W 24/10 |
| WO | WO-2017118235 A1 | * 7/2017 | .............. H04J 11/00 |

OTHER PUBLICATIONS

ZTE, "Initial consideration on RIM(Remote Interference Miligation)," BGPP TSG RAN WG3 NR#101bis, Chengdu, China R3-185469, total 8 pages, 3rd Generation Partnership Project, Valbonne, France (Oct. 8-12, 2018).

"3rd Generation Partnership Project; Technical Specification Group Radio Access Network; Study on remote interference management for NR (Release 16)," 3GPP TR 38.866 V16.1.0, total 31 pages, 3rd Generation Partnership Project, Valbonne, France (Mar. 2019).

CMCC, "Signalling flow with CN involvement for backhaul-based RIM frameworks," 3GPP TSG-RAN WG3 #102, Spokane, USA, R3-186623, total 9 pages, 3rd Generation Partnership Project, Valbonne, France (Nov. 12-16, 2018).

"3rd Generation Partnership Project; Technical Specification Group Radio Access Network; NG-RAN; NG Application Protocol (NGAP)(Release 15)," 3GPP TS 38.413 V15.3.0, total 319 pages, 3rd Generation Partnership Project, Valbonne, France (Mar. 2019).

Ericsson, "On X2 TNL Address discovery for option 3—stage 3 TP," 3GPP TSG-RAN WG3 Meeting #97bis, Prague, Czech Republic, R3-173936, total 11 pages, 3rd Generation Partnership Project, Valbonne, France (Oct. 9-13, 2017).

* cited by examiner

ATMOSPHERIC DUCT INTERFERENCE ELIMAMATING SCHEME

CROSS-REFERENCE TO RELATED APPLICATIONS

This application is a continuation of International Application No. PCT/CN2020/087970, filed on Apr. 30, 2020, which claims priority to Chinese Patent Application No. 201910363600.7, filed on Apr. 30, 2019. The disclosures of the aforementioned applications are hereby incorporated by reference in their entireties.

TECHNICAL FIELD

This application relates to the field of communications technologies, and in particular, to a communication method and apparatus.

BACKGROUND

In a time division duplexing (TDD) system, a base station uses different slots of a same frequency channel to receive an uplink signal and send a downlink signal. In addition, to avoid interference caused by the downlink signal of the base station to the uplink signal, a guard period (GP) is usually set between receiving the uplink signal by the base station and sending the downlink signal by the base station.

When a first base station is relatively far away from a second base station in the TDD system, because signal attenuation occurs in a transmission process of a downlink signal sent by the second base station, the downlink signal that has a relatively low signal strength usually does not interfere with an uplink signal that is sent by another base station and received by the first base station. However, in some actual application scenarios, there may be an atmospheric duct between the first base station and the second base station, and the atmospheric duct enables a downlink signal sent by the second base station to still have a relatively high signal strength when the downlink signal is transmitted in the atmospheric duct even if the downlink signal is transmitted for tens or hundreds of kilometers. In addition, because a signal transmission distance is relatively long, and a signal transmission delay is greater than preset GP duration, the downlink signal with the relatively high signal strength falls within a receive window of an uplink signal of the first base station. Consequently, relatively severe signal interference is caused to receiving of the uplink signal by the first base station.

A base station affected by atmospheric duct interference cannot perform a service or barely maintains a service. Consequently, user experience deteriorates sharply.

SUMMARY

To resolve the foregoing problem, embodiments of this application provide a communication method and apparatus, so that when a first base station determines that the first base station is affected by atmospheric duct interference from a downlink signal of a second base station, the first base station notifies the second base station of the atmospheric duct interference through a core network. In this way, an atmospheric duct interference source can be effectively notified. Therefore, the interference source can perform corresponding interference avoidance in time, thereby improving a success rate of eliminating the atmospheric duct interference.

According to a first aspect, an embodiment of this application provides a communication method, including: determining that a first base station is affected by atmospheric duct interference from a second base station; and sending, by the first base station, first information to the second base station through a core network, where the first information is used to indicate that the first base station is affected by the atmospheric duct interference from the second base station. In this implementation, in a process of receiving an uplink signal, the first base station may detect whether the first base station is affected by the atmospheric duct interference from the second base station, that is, detect whether the first base station is affected by interference caused by transmission, of a downlink signal of the second base station, in an atmospheric duct. When the first base station determines that the first base station is affected by the atmospheric duct interference from the second base station, the first base station may send, to the second base station through the core network, the first information used to indicate that the first base station is affected by the atmospheric duct interference from the second base station, so that the second base station can learn in time, based on the first information, that the second base station currently interferes with the first base station. Therefore, the second base station can perform corresponding interference avoidance in time, thereby improving a success rate of eliminating the atmospheric duct interference.

With reference to the first aspect, in a first possible implementation of the first aspect, the first information is carried in a target field, and the target field includes at least one or more of the following fields: a transport layer address field, an internet protocol security transport layer address field, and a general packet radio service tunneling protocol transport layer address field. In this implementation, existing fields (namely, the transport layer address field, the internet protocol security transport layer address field, and the general packet radio service tunneling protocol transport layer address field) in the first information may be specifically redefined, so that the second base station may determine, by parsing these fields in the first information, whether the second base station interferes with another base station. In addition, in this implementation, one field may be redefined, for example, only the transport layer address field is redefined; or a plurality of fields may be redefined, that is, two fields, namely, the internet protocol security transport layer address field and the general packet radio service tunneling protocol transport layer address field, may be redefined. Certainly, the three fields may alternatively be simultaneously redefined, to indicate, by using the three fields simultaneously, that the first base station is affected by the atmospheric duct interference from the second base station.

With reference to the first possible implementation of the first aspect, in a second possible implementation of the first aspect, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station; or when the target field includes two or three of the transport layer address field, the internet protocol security transport layer address field, and the general packet radio service tunneling protocol transport layer address field, the first information includes two or three values in a value of the transport layer address field, a value of the internet protocol security transport layer address field, or a value of the general packet radio service tunneling protocol transport layer address field; and the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station. In this implementation, when a field of the existing fields in the first information is used to indicate that the first base station is affected by the atmospheric duct interference from the second base station, if one field is redefined only, when a value of the redefined field is the first value, it represents that the first base station is affected by the atmospheric duct interference from the second base station, and conversely, when the value of the redefined field is not the first value, it may represent that the first base station is not affected by the atmospheric duct interference from the second base station. Certainly, if at least two fields are redefined, it may represent that the first base station is affected by the atmospheric duct interference from the second base station only when the redefined fields are each the second value, and conversely, when at least one of the redefined fields is not the second value, it may represent that the first base station is not affected by the atmospheric duct interference from the second base station. In this way, the second base station can determine the atmospheric duct interference by parsing a value of a specific field in the first information.

With reference to any one of the first aspect to the second possible implementation of the first aspect, in a third possible implementation of the first aspect, the first information further includes an identifier of the second base station and a tracking area code of the second base station. In this implementation, a plurality of servers in the core network may need to communicate between the first base station and the second base station. In this case, the first information sent by the first base station may include the tracking area code of the second base station and the identifier of the second base station. In this way, the server in the core network may forward, based on the tracking area code of the second base station, the first information to a server connected to the second base station (or a server configured to manage the second base station), so that the server connected to the second base station can forward the first information to the second base station based on the identifier, of the second base station, included in the first information.

With reference to the third possible implementation of the first aspect, in a fourth possible implementation of the first aspect, the identifier of the second base station and the tracking area code of the second base station are used by a network element in the core network to forward the first information to the second base station. In this implementation, the network element in the core network may forward the first information from the first base station to the second base station based on the identifier of the second base station and the tracking area code of the second base station, so that the first information can reach the second base station. This can improve a success rate of notifying, by the first base station, the second base station that the first base station is interfered with by the second base station.

With reference to any one of the first aspect to the fourth possible implementation of the first aspect, in a fifth possible implementation of the first aspect, the first information further includes an identifier of the first base station and a tracking area code of the first base station. In this implementation, after receiving the first information, the second base station may determine a source of the first information based on the identifier of the first base station and the tracking area code of the first base station that are included in the first information, and determine a specific base station that the second base station currently interferes with in receiving of an uplink signal. In this way, when processing an atmospheric duct interference problem, the second base station may collect statistics on a base station pair (that is, the first base station and the second base station) in which there is atmospheric duct mutual interference, so that the second base station performs corresponding atmospheric duct interference avoidance for the first base station.

With reference to any one of the first aspect to the fifth possible implementations of the first aspect, in a sixth possible implementation of the first aspect, that the first base station determines that the first base station is affected by atmospheric duct interference from a second base station includes: receiving, by the first base station, the identifier of the second base station from the second base station through an air interface, and detecting, by the first base station, that a received signal meets an atmospheric duct interference decision condition. In this implementation, the second base station may broadcast the identifier of the second base station to another base station after detecting that the second base station is affected by atmospheric duct interference. In this way, the first base station may receive the identifier of the second base station through the air interface, and at the same time, if the first base station detects that the received signal meets the atmospheric duct interference decision condition, for example, the first base station detects, for the uplink signal, that a signal interference strength is greater than a threshold, it may be determined that the first base station is affected by the atmospheric duct interference from the second base station.

With reference to the sixth possible implementation of the first aspect, in a seventh possible implementation of the first aspect, the identifier of the second base station is broadcast by the second base station when the second base station detects that a signal received by the second base station is affected by the atmospheric duct interference. In this implementation, the first base station can receive the identifier of the second base station. That is because the second base station detects, by detecting the received signal, that the second base station is affected by the atmospheric duct interference, and broadcasts the identifier of the second base station after determining that the second base station is affected by the atmospheric duct interference. In this way, the first base station can detect the identifier of the second base station through the air interface.

According to a second aspect, an embodiment of this application further provides a communication method. The method includes: A second base station receives first information from a first base station, where the first information is used to indicate that the first base station is affected by atmospheric duct interference from the second base station. The second base station determines, based on the first information, that the second base station causes atmospheric duct interference to the first base station.

With reference to the second aspect, in a first possible implementation of the second aspect, the first information is carried in a target field, and the target field includes at least one of the following fields: a transport layer address field, an internet protocol security transport layer address field, and a general packet radio service tunneling protocol transport layer address field.

With reference to the first possible implementation of the second aspect, in a second possible implementation of the second aspect, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station; or when the target field includes two or three of the transport layer address field, the internet protocol security transport layer address field, or the general packet radio service tunneling protocol transport layer address field, the first information includes two or three values in a value of the transport layer address field, a value of the internet protocol security transport layer address field, and a value of the general packet radio service tunneling protocol transport layer address field; and the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

With reference to any one of the second aspect to the second possible implementation of the second aspect, in a third possible implementation of the second aspect, the first information further includes an identifier of the first base station and a tracking area code of the first base station.

With reference to any one of the second aspect to the third possible implementation of the second aspect, in a fourth possible implementation of the second aspect, the first information further includes an identifier of the second base station and a tracking area code of the second base station.

The communication method provided in the second aspect corresponds to the communication method provided in the first aspect. Therefore, for various possible implementations of the communication method provided in the second aspect, refer to the various possible implementations of the communication method provided in the first aspect.

According to a third aspect, an embodiment of this application further provides a communication method. The method includes: A core network element receives first information from a first base station, where the first information is used to indicate that the first base station is affected by atmospheric duct interference from the second base station. The core network element sends the first information to the second base station.

With reference to the third aspect, in a first possible implementation of the third aspect, the first information includes an identifier of the second base station and a tracking area code of the second base station. That the core network element forwards the first information to the second base station includes: The core network element sends the first information to the second base station based on the identifier of the second base station and the tracking area code of the second base station.

The communication method provided in the third aspect corresponds to the communication method provided in the first aspect. Therefore, for various possible implementations of the communication method provided in the third aspect, refer to the various possible implementations of the communication method provided in the first aspect.

According to a fourth aspect, an embodiment of this application further provides a communications apparatus, where the apparatus is used in a first base station. The apparatus includes: a determining module, configured to determine that the first base station is affected by atmospheric duct interference from a second base station; and a sending module, configured to send first information to the second base station through a core network, where the first information is used to indicate that the first base station is affected by the atmospheric duct interference from the second base station.

With reference to the fourth aspect, in a first possible implementation of the fourth aspect, the first information is carried in a target field, and the target field includes at least one or more of the following fields: a transport layer address field, an internet protocol security transport layer address field, and a general packet radio service tunneling protocol transport layer address field.

With reference to the first possible implementation of the fourth aspect, in a second possible implementation of the fourth aspect, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station; or when the target field includes two or three of the transport layer address field, the internet protocol security transport layer address field, and the general packet radio service tunneling protocol transport layer address field, the first information includes two or three values in a value of the transport layer address field, a value of the internet protocol security transport layer address field, or a value of the general packet radio service tunneling protocol transport layer address field; and the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

With reference to any one of the fourth aspect to the second possible implementation of the first aspect, in a third possible implementation of the fourth aspect, the first information further includes an identifier of the second base station and a tracking area code of the second base station.

With reference to the third possible implementation of the fourth aspect, in a fourth possible implementation of the fourth aspect, the identifier of the second base station and the tracking area code of the second base station are used by a network element in the core network to forward the first information to the second base station.

With reference to any one of the fourth aspect to the fourth possible implementation of the first aspect, in a fifth possible implementation of the fourth aspect, the first information further includes an identifier of the first base station and a tracking area code of the first base station.

With reference to any one of the fourth aspect to the fifth possible implementation of the first aspect, in a sixth possible implementation of the fourth aspect, the determining module includes: a receiving unit, configured to receive the identifier of the second base station from the second base station through an air interface; and a detection unit, configured to detect that a received signal meets an atmospheric duct interference decision condition.

With reference to the sixth possible implementation of the fourth aspect, in a seventh possible implementation of the fourth aspect, the identifier of the second base station is broadcast by the second base station when the second base station detects that the signal received by the second base station is affected by atmospheric duct interference.

The communications apparatus provided in the fourth aspect corresponds to the communication method provided in the first aspect. Therefore, for various possible implementations of the communications apparatus provided in the fourth aspect, refer to the various possible implementations of the communication method provided in the first aspect.

According to a fifth aspect, an embodiment of this application further provides a communications apparatus, where the apparatus is used in a second base station. The apparatus includes: a receiving module, configured to receive first information from a first base station, where the first information is used to indicate that the first base station is affected by atmospheric duct interference from the second base station; and a determining module, configured to determine, based on the first information, that the second base station causes the atmospheric duct interference to the first base station.

With reference to the fifth aspect, in a first possible implementation of the fifth aspect, the first information is carried in a target field, and the target field includes at least one of the following fields: a transport layer address field, an internet protocol security transport layer address field, and a general packet radio service tunneling protocol transport layer address field.

With reference to the first possible implementation of the fifth aspect, in a second possible implementation of the fifth aspect, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station; or when the target field includes two or three of the transport layer address field, the internet protocol security transport layer address field, or the general packet radio service tunneling protocol transport layer address field, the first information includes two or three values in a value of the transport layer address field, a value of the internet protocol security transport layer address field, and a value of the general packet radio service tunneling protocol transport layer address field; and the two or three values in the value of the transport layer address field, the value of the internet protocol security transport layer address field, or the value of the general packet radio service tunneling protocol transport layer address field are each a second value, and the second value indicates that the first base station is affected by the atmospheric duct interference from the second base station.

With reference to any one of the fifth aspect to the second possible implementation of the fifth aspect, in a third possible implementation of the fifth aspect, the first information further includes an identifier of the first base station and a tracking area code of the first base station.

With reference to any one of the fifth aspect to the third possible implementation of the second aspect, in a fourth possible implementation of the fifth aspect, the first information further includes an identifier of the second base station and a tracking area code of the second base station.

The communications apparatus provided in the fifth aspect corresponds to the communication method provided in the second aspect. Therefore, for various possible implementations of the communications apparatus provided in the fifth aspect, refer to the various possible implementations of the communication method provided in the second aspect.

According to a sixth aspect, an embodiment of this application further provides a communications apparatus. The apparatus is used in a core network element. The apparatus includes: a receiving module, configured to receive first information from a first base station, where the first information is used to indicate that the first base station is affected by atmospheric duct interference from a second base station; and a sending module, configured to send the first information to the second base station.

With reference to the sixth aspect, in a first possible implementation of the sixth aspect, the first information includes an identifier of the second base station and a tracking area code of the second base station. The sending module is specifically configured to send the first information to the second base station based on the identifier of the second base station and the tracking area code of the second base station.

The communications apparatus provided in the sixth aspect corresponds to the communication method provided in the third aspect. Therefore, for various possible implementations of the communications apparatus provided in the sixth aspect, refer to the various possible implementations of the communication method provided in the third aspect.

According to a seventh aspect, an embodiment of this application further provides a communications apparatus, including a processor, where the processor is coupled to a memory. The memory is configured to store a computer program or instructions. The processor is configured to execute the computer program or the instructions, so that the communication method according to any one of the implementations of the first aspect or the communication method according to any one of the implementations of the second aspect is performed. Optionally, the communications apparatus may include the memory. The communications apparatus may be a base station or a chip in the base station.

According to an eighth aspect, an embodiment of this application further provides a communications apparatus, including a processor, where the processor is coupled to a memory. The memory is configured to store a computer program or instructions. The processor is configured to execute the computer program or the instructions, so that the communication method according to any one of the implementations of the third aspect is performed.

According to a ninth aspect, an embodiment of this application further provides a chip. The chip includes a processor and an interface circuit, and the interface circuit is coupled to the processor. The processor is configured to run a computer program or instructions, to implement the method according to any one of the first aspect to the third aspect. The interface circuit is configured to communicate with a module other than the chip. Optionally, the communications apparatus may include the memory. The communications apparatus may be a chip in a first base station, a second base station, or a core network element.

According to a tenth aspect, an embodiment of this application further provides a computer-readable storage medium. The computer-readable storage medium stores a program configured to implement the method in any one of the first aspect to the third aspect. For example, when the program is run in a base station, the base station is enabled to perform the method in the first aspect or the second aspect. When the program is run in a core network element, the core network element is enabled to perform the method in the third aspect.

According to an eleventh aspect, an embodiment of this application provides a computer program product. The program product includes a program. When the program is run, the method in any one of the first aspect to the third aspect is performed.

It can be learned from the foregoing technical solution that, in the embodiments of this application, when determining that the first base station is affected by the atmospheric duct interference from the second base station, the first base station notifies the second base station in a wired link manner, and specifically, may send, to the second base station through the core network, information used to indicate that the first base station is affected by the atmospheric duct interference from the second base station. It may be understood that the information sent through the core network is not easily affected by a natural environment, so that a change of the natural environment may not affect receiving, by the second base station, of the information sent by the first base station. This can improve a success rate of receiving, by the second base station, a message sent by the first base station. Therefore, the second base station can perform corresponding interference avoidance in time based on the received message, thereby improving a success rate of eliminating the atmospheric duct interference.

BRIEF DESCRIPTION OF DRAWINGS

To describe the technical solutions in the embodiments of this application more clearly, the following briefly describes the accompanying drawings for describing the embodiments. It is clear that the accompanying drawings in the following description show merely some embodiments of this application, and a person of ordinary skill in the art may derive other drawings from these accompanying drawings.

DESCRIPTION OF EMBODIMENTS

Figure 1:
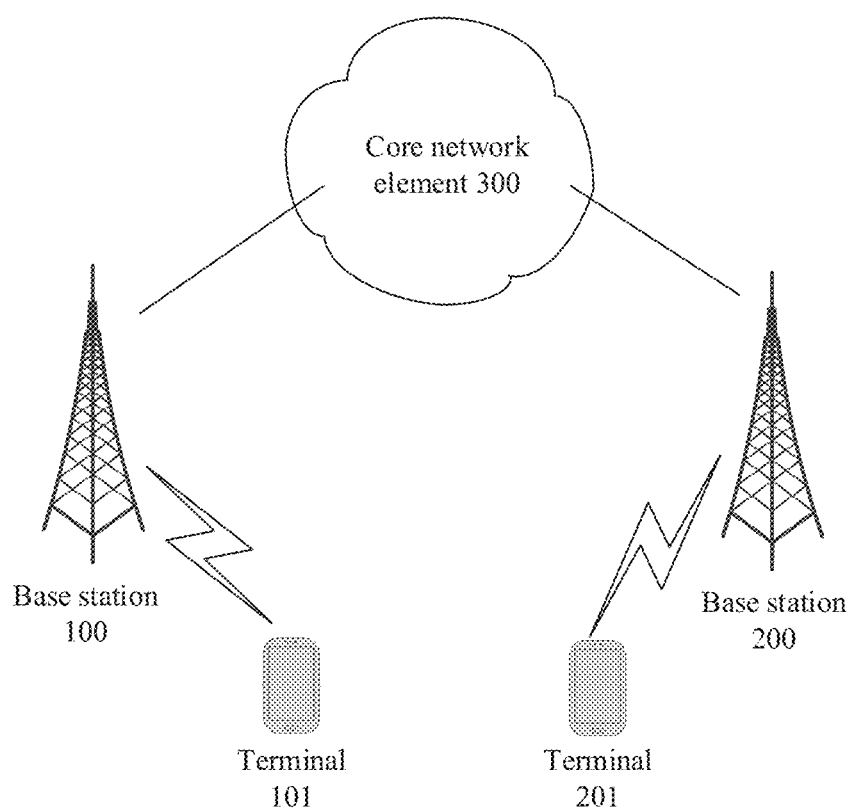
FIG. 1 is a schematic diagram of an example application scenario according to an embodiment of this application.

For a first base station and a second base station in a TDD system, there is a specific delay in a process of transmitting a downlink signal from the second base station to the first base station. Therefore, to avoid that the downlink signal sent by the second base station causes interference to an uplink signal received by the first base station, a GP of specific duration is usually set between sending of the downlink signal by the second base station and receiving of the uplink signal by the first base station. If the first base station is relatively close to the second base station, transmission duration required for transmitting the downlink signal of the second base station from the second base station to the first base station is usually less than the specified GP duration, so that the downlink signal of the second base station does not fall within a receive window of the uplink signal of the first base station. Therefore, the downlink signal does not interfere with receiving of the uplink signal of the first base station. If the first base station is relatively far away from the second base station, in a process in which the downlink signal of the second base station is transmitted from the second base station to the first base station, because of long-distance signal attenuation, the downlink signal has a relatively low signal strength when the downlink signal arrives at the first base station after being transmitted, and also does not interfere with receiving of the uplink signal by the first base station.

However, in some actual application scenarios, there may be an atmospheric duct between the first base station and the second base station under a specific meteorological or geographical condition. In this case, when a downlink signal of the second base station is transmitted in the atmospheric duct, most radio wave radiation of the downlink signal is limited in the atmospheric duct, and a loss of the downlink signal is relatively small in a transmission process. Therefore, a signal strength is relatively high when the downlink signal arrives at the first base station after being transmitted. In addition, long-distance transmission causes transmission duration of the downlink signal to be greater than specified GP duration, so that the downlink signal with the relatively high signal strength falls within a receive window of an uplink signal of the first base station. Consequently, the downlink signal of the second base station interferes with receiving of the uplink signal by the first base station.

Based on this, an embodiment of this application provides a communication method, so that when determining that the first base station is interfered with by the second base station, the first base station successfully notifies the second base station that the second base station is interfering with the first base station, thereby improving a success rate of eliminating an atmospheric duct. Specifically, because quality of a radio channel between the first base station and the second base station changes easily due to impact of a natural environment, it cannot be ensured that the quality of the radio channel is always in a high-quality state. Therefore, when determining that the first base station is affected by the atmospheric duct interference from the second base station, the first base station may notify the second base station in a wired link manner, and specifically, may send, to the second base station through a core network, information used to indicate that the first base station is affected by the atmospheric duct interference from the second base station. It may be understood that the message sent through the core network is not easily affected by the natural environment, so that a change of the natural environment may not affect receiving, by the second base station, of the information sent by the first base station. This can improve a success rate of receiving, by the second base station, information sent by the first base station. Therefore, the second base station can perform corresponding interference avoidance in time based on the received message, thereby improving a success rate of eliminating the atmospheric duct interference.

In an example, this embodiment of this application may be applied to an example communications system shown in FIG. 1. In the communications system, a base station 100 and a base station 200 may communicate with each other through a core network element 300 shown in FIG. 1. For example, the base station 100 may send a signal to the base station 200 through the core network element, and the base station 200 may send a signal to the base station 100 through the core network element 300. Optionally, the core network element 300 may be one core network element, or may be a plurality of core network elements, and this is not limited in this embodiment of this application.

Optionally, the base station 100 and a terminal 101 may communicate with each other through an air interface. For example, the base station 100 may receive an uplink signal from the terminal 101, and the base station 200 may send a downlink signal to the terminal 101. The base station 200 may communicate with a terminal 201 through an air interface. For example, the base station 200 may send a downlink signal to the terminal 201, and the base station 200 may receive the downlink signal from the terminal 201.

Optionally, there may be an interface between the base station 100 and the base station 200. For example, the interface is an X2 interface or an Xn interface. In an example, when a distance between the base station 100 and the base station 200 is relatively short, there may be an interface between the base station 100 and the base station 200. Optionally, there may be no interface between the base station 100 and the base station 200. In an example, when a distance between the base station 100 and the base station 200 is relatively long, there may be no interface between the base station 100 and the base station 200.

It should be noted that a network element included in a scenario shown in FIG. 1 is merely an example, and a connection manner between network elements is also merely an example. In this embodiment of this application, types and a quantity of network elements included in the communications system, and a connection relationship between the network elements are not limited thereto.

The communications system may be a communications system that supports a fourth generation (4G) access technology, for example, a long term evolution (LTE) access technology. Alternatively, the communications system may be a communications system that supports a fifth generation (5G) access technology, for example, a new radio (NR) access technology. Alternatively, the communications system may be a communications system that supports a third generation (3G) access technology, for example, a (UMTS) access technology. Alternatively, the communications system may be a communications system that supports a plurality of radio technologies, for example, a communications system that supports an LTE technology and an NR technology. In addition, the communications system is alternatively applicable to a future-oriented communications technology.

The base station (BS) in this embodiment of this application may be a device that is on an access network side and that is configured to support a terminal in accessing a communications system, for example, may be an evolved base station (evolved nodeB, eNB) in a 4G access technology communications system, a next-generation base station (next generation nodeB, gNB) in a 5G access technology communications system, a transmission reception point (TRP), a relay node, an access point (AP), or a base station possibly emerges in the future with evolution of wireless communications technologies. The base station may be fixed or mobile. The base station may be referred to as an access network device, a network side device, or the like.

In the communications system shown in FIG. 1, the core network element 300 may be a core network element in a 4G evolved packet core network (evolved packet core, EPC), or may be a core network element in a 5G core network (5G core, 5GC), or an enhanced core network element in an evolution process of radio access technologies. This type of enhanced core network element belongs to various generations of radio access technologies, and is upgraded in consideration of progressive deployment, so that the enhanced core network element has a function of a next-generation access technology. For example, an enhanced 4G core network element that merges in an evolution process from LTE to NR has a function of a 5GC network element, but a type of the 4G enhanced core network element still belongs to an EPC network element. The 4G enhanced core network element herein may have another name, for example, an enhanced EPC network element or a new-type EPC network element. This is not limited in this embodiment of this application. For example, the core network element 300 may be a mobility management entity (MME) or an enhanced MME in an EPC or a 4G enhanced core network, or the core network element 300 may be an access and mobility management function (AMF) entity or an enhanced AMF in a 5GC.

In the communications system shown in FIG. 1, because there is an atmospheric duct between the base station 100 and the base station 200, when the base station 200 sends a downlink signal to the terminal 201, the downlink signal is also transmitted to the base station 100 through the atmospheric duct. Consequently, when receiving an uplink signal from the terminal 101, the base station 100 is affected by atmospheric duct interference from the downlink signal of the base station 200.

This embodiment of this application provides a solution. After determining that the base station 100 is affected by the atmospheric duct interference from the downlink signal of the base station 200, the base station 100 may send first information to the core network element 300, and the core network element 300 forwards the first information to the base station 200, where the first information is used to indicate that the base station 100 is affected by the atmospheric duct interference from the base station 200, so that the base station 100 performs corresponding interference avoidance based on the received first information.

It may be understood that the foregoing scenario is merely an example of a scenario provided in this embodiment of this application, and this embodiment of this application is not limited to this scenario. For example, in another possible scenario, the base station 100 may send the first information to the base station 200 through at least two core network elements in a core network. In conclusion, this embodiment of this application may be applied to any applicable scenario, and is not limited to the foregoing scenario.

Various non-limiting specific implementations of a communication method in embodiments of this application are described in detail below with reference to the accompanying drawings by using embodiments. In the following, a first base station may be the base station 100 in the example communications system shown in FIG. 1, a second base station may be the base station 200 in the example communications system shown in FIG. 1, and a core network element may be the core network element 300 in the example communications system shown in FIG. 1.

Figure 2:
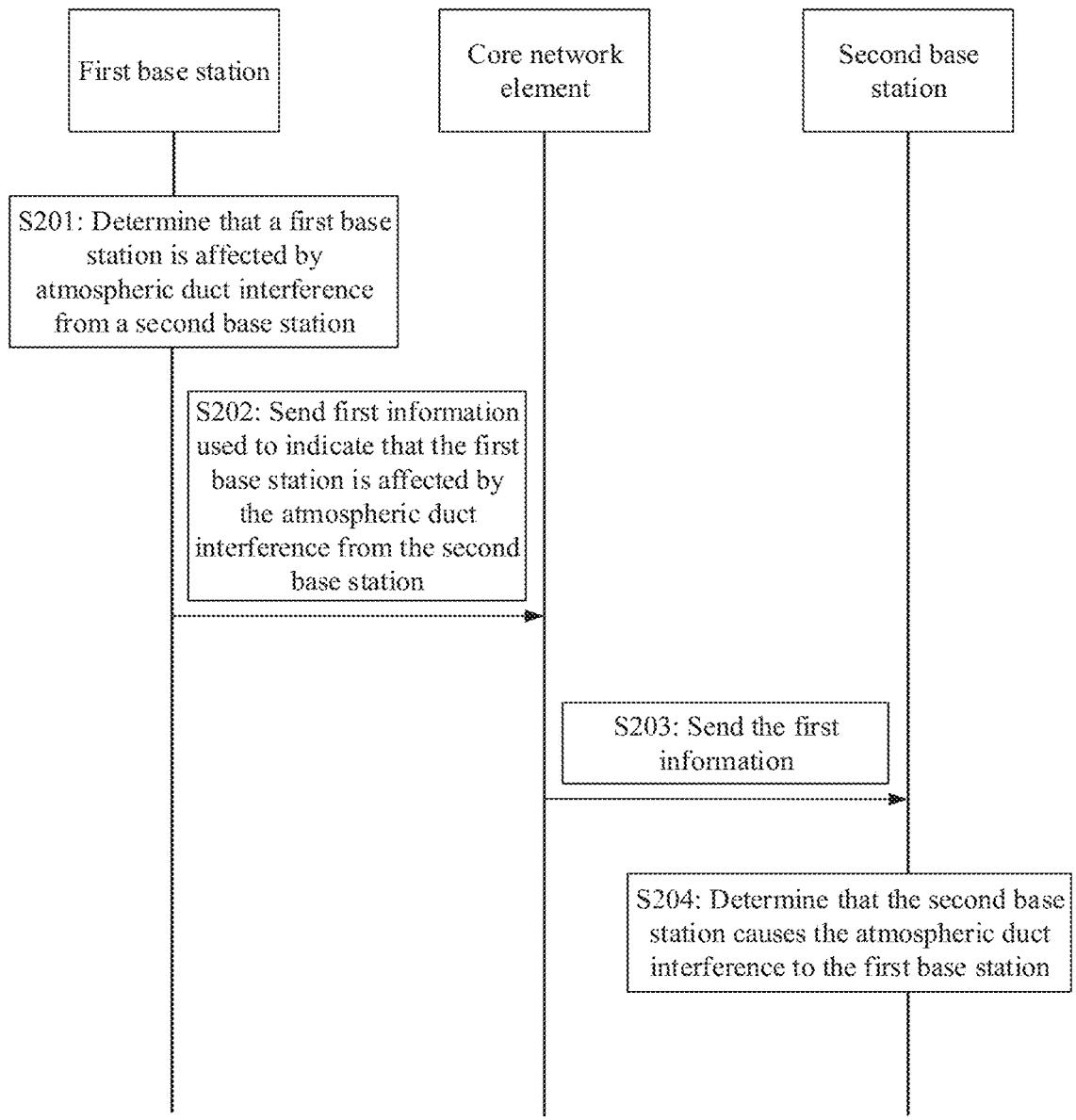
FIG. 2 is a schematic diagram of signaling exchange of a communication method according to an embodiment of this application.

FIG. 2 is a schematic diagram of signaling exchange of a communication method according to an embodiment of this application. The method may specifically include the following steps.

S201: A first base station determines that the first base station is affected by atmospheric duct interference from a second base station.

The atmospheric duct interference means that, because a downlink signal of the second base station is transmitted in an atmospheric duct, the downlink signal still has a relatively high signal strength when the downlink signal arrives at the first base station after being transmitted, and consequently, the downlink signal interferes with receiving, by the first base station, of an uplink signal sent by another base station. It may be understood that, when the second base station is relatively far away from the first base station, the downlink signal of the second base station usually cannot interfere with the first base station. However, if the downlink signal of the second base station has a capability of interfering with the first base station, this is usually because the downlink signal arrives at the first base station through transmission in the atmospheric duct.

Optionally, the first base station determines that the first base station is affected by the atmospheric duct interference from the second base station, and may detect the atmospheric duct interference, and the first base station receives, through an air interface, an identifier of the second base station broadcast by the second base station.

In a specific implementation of determining the atmospheric duct interference, based on channel reciprocity, if a downlink signal of the second base station interferes with receiving of an uplink signal by the first base station, it may be considered that a downlink signal of the first base station also interferes with receiving of an uplink signal by the second base station. When the second base station detects that the second base station is affected by atmospheric duct interference in a process of receiving an uplink signal, although the second base station may not currently determine a specific base station that causes the atmospheric duct interference to the second base station, the second base station may broadcast an identifier of the second base station to another base station, to notify, by using the identifier of the second base station, the another base station that the second base station is affected by the atmospheric duct interference. The downlink signal of the second base station may be transmitted in an atmospheric duct between the first base station and the second base station, and causes the atmospheric duct interference to the first base station. Therefore, the first base station may also receive, through the atmospheric duct, the identifier of the second base station broadcast by the second base station, and therefore determine, based on the received identifier of the second base station, a specific base station that is interfering with the first base station. Certainly, when the second base station performs atmospheric duct interference detection, the first base station may also perform interference detection. In this way, when the first base station receives the identifier of the second base station through the air interface, and the first base station also detects that uplink interference meets an atmospheric duct interference decision condition, the first base station can determine that the first base station is affected by the atmospheric duct interference from the second base station. In an example, the interference detected by the first base station meets an atmospheric duct interference decision condition. The atmospheric duct interference decision condition may be understood as a characteristic meeting atmospheric duct interference. In this case, it may be determined that the interference affecting the base station is atmospheric duct interference instead of another type of interference. Specifically, the atmospheric duct interference decision condition may be that all a plurality of consecutive uplink symbols are interfered, where an interference strength of a latter uplink symbol is relatively weak compared with an interference strength of a former uplink symbol. For example, in the plurality of consecutive uplink symbols, an interference strength of the $1^{st}$ uplink symbol is the strongest, and then interference strengths of uplink symbols subsequent to the $1^{st}$ uplink symbol decrease. It should be noted that "former" and "latter" are relative rather than absolute. Optionally, the atmospheric duct interference decision condition may further include that an average interference strength of the uplink symbols received by the first base station is greater than a preset threshold.

S202: The first base station sends first information to a core network element, where the first information is used to indicate that the first base station is affected by the atmospheric duct interference from the second base station.

In an example, the first information may be specifically located in an uplink radio access network configuration transfer (Uplink RAN Configuration Transfer) message. After the first base station sends the Uplink RAN Configuration Transfer message that includes the first information to a core network, the first information in the Uplink RAN Configuration Transfer message may be transparently transmitted in a non-access stratum (NAS) of the core network, and the NAS may not participate in parsing of the first information. In this way, even if the first base station is relatively far away from the second base station, the core network can transmit the first information from the first base station to the second base station.

In some actual application implementations, specifically, a value of a target field that carries the first information may be used to indicate that the first base station is affected by the atmospheric duct interference from the second base station. The target field may be an existing field or a newly added field.

In an example, the target field may be specifically a field included in a self-organizing network configuration transfer (SON Configuration Transfer) field of the Uplink RAN Configuration Transfer message. In this embodiment, indication of the atmospheric duct interference may be implemented by redefining a meaning of an existing field in the SON Configuration Transfer field. Alternatively, a new field may be added to the SON Configuration Transfer field, and a meaning of the new field is defined, so that the new field can be used to indicate the atmospheric duct interference.

Specifically, when the target field is specifically an existing field in the SON Configuration Transfer field, the target field may be specifically any one or more fields in fields such as a Transport Layer Address (Transport Layer Address) field, an internet protocol security transport layer address (IP-Sec Transport Layer Address) field, and a general packet radio service tunneling protocol transport layer address (GTP Transport Layer Address) field that are in the SON Configuration Transfer field.

Further, when the target field is any one of the Transport Layer Address field, the IP-Sec Transport Layer Address field, and the GTP Transport Layer Address field, the first information may include a value of a corresponding field in the Transport Layer Address field, the IP-Sec Transport Layer Address field, and the GTP Transport Layer Address field. In this case, the following may be defined: When the target field indicates that the second base station causes atmospheric duct interference to the first base station, a value of the target field is a first value. In this way, if determining, based on the Transport Layer Address field, the IP-Sec Transport Layer Address field, and the GTP Transport Layer Address field that are of the SON Configuration Transfer field that is received, a value of one of the fields as the first value, the second base station determines that the second base station causes atmospheric duct interference to the first base station. For example, when the target field is specifically the Transport Layer Address field, the following may be defined: When a value of the Transport Layer Address field is 0.0.0.0, it represents that the second base station currently causes atmospheric duct interference to the first base station. However, when a value of the Transport Layer Address field is not 0.0.0.0, it represents that the second base station currently does not cause atmospheric duct interference to the first base station.

In addition, when the target field includes any two of the Transport Layer Address field, the IP-Sec Transport Layer Address field, and the GTP Transport Layer Address field or includes the three fields, the first message may include values of two corresponding fields in the Transport Layer Address field, the IP-Sec Transport Layer Address field, and the GTP Transport Layer Address field or values of the three fields. In this case, in an example, the following may be defined: When the target field indicates that the first base station is affected by atmospheric duct interference from the second base station, values of the any two of the Transport Layer Address field, the IP-Sec Transport Layer Address field, and the GTP Transport Layer Address field or the three fields are each a second value, to indicate that the second base station causes the atmospheric duct interference to the first base station. For example, when the target field includes the three fields, namely, the Transport Layer Address field, the IP-Sec Transport Layer Address field, and the GTP Transport Layer Address field, the following may be defined: When values of the three fields are each 0.0.0.0, it represents that the second base station currently causes atmospheric duct interference to the first base station, as shown in Table 1. However, when not all values of the three fields are 0.0.0.0, it represents that the second base station currently does not cause atmospheric duct interference to the first base station.

In the foregoing implementation, it is required that it represent that the second base station currently causes atmospheric duct interference to the first base station only when values of different fields included in the target field are each the second value. Certainly, in another possible implementation, if the target field includes any two of the Transport Layer Address field, the IP-Sec Transport Layer Address field, and the GTP Transport Layer Address field or the three fields, the following may alternatively be defined: It represents that the second base station currently causes atmospheric duct interference to the first base station only when values of included different fields are different. For example, it is assumed that the target field includes the foregoing three fields. In this case, the following may be defined: When a value of the Transport Layer Address field is 1.1.1.1, a value of the IP-Sec Transport Layer Address field is 2.2.2.2, and a value of the GTP Transport Layer Address field is 3.3.3.3, it represents that the second base station currently causes atmospheric duct interference to the first base station, as shown in Table 2. However, when a value of any one of the three fields is not a preset value, it represents that the second base station currently does not cause atmospheric duct interference to the first base station.

TABLE 1

| Information element/Group name | Field value |
| --- | --- |
| Transport Layer Address | 0.0.0.0 |
| IP-Sec Transport Layer Address | 0.0.0.0 |
| GTP Transport Layer Address | 0.0.0.0 |

TABLE 2

| Information element/Group name | Field value |
| --- | --- |
| Transport Layer Address | 1.1.1.1 |
| IP-Sec Transport Layer Address | 2.2.2.2 |
| GTP Transport Layer Address | 3.3.3.3 |

In addition to the existing field in the SON Configuration Transfer field, the new field that is added to the SON Configuration Transfer field may also be used to indicate that the second base station causes atmospheric duct interference to the first base station in another possible implementation. In this way, base stations produced by different vendors may interact with each other based on the newly added field defined in the SON Configuration Transfer field. This can avoid a case in which different base stations produced by the different vendors cannot interact with each other due to different field definition manners (including definitions of fields, definitions of field values such as the first value and the second value, and the like) of the different vendors.

In an example, an atmospheric duct interference field may be added to a target radio access network node identifier (Target RAN Node ID) field in the SON Configuration Transfer field. When a value of the atmospheric duct interference field is 1, it may represent that the second base station causes atmospheric duct interference to the first base station, as shown in Table 3. When a value of the atmospheric duct interference field is 0, it may represent that the second base station does not cause atmospheric duct interference to the first base station.

TABLE 3

| Information element/Group name | Field value |
|---|---|
| Target RAN Node ID | |
| >Atmospheric duct interference | 1 |

Optionally, the first information may further include information about the second base station, and for example, may include an identifier of the second base station and a tracking area code of the second base station.

Optionally, the first information may further include information about the first base station, and for example, may include an identifier of the first base station and a tracking area code of the first base station.

Optionally, the foregoing target field (for example, any one or more of a transport layer address field, an internet protocol security transport layer address field, or a general packet radio service tunneling protocol transport layer address field) or a newly added field (for example, the atmospheric duct interference field) may only indicate that the first base station is interfered with.

Optionally, the target field or the newly added field may indicate, with reference to information about a main body (that is, the first base station) that sends the first information or the information about the first base station, that the first base station is interfered with.

Optionally, the target field or the newly added field may indicate, with reference to the information about the first base station and/or the information about the second base station, that the first base station is interfered with by the second base station.

S203: The core network element sends the first information to the second base station.

Optionally, in a process of transmitting the first information from the first base station to the second base station, the first information may be carried in different messages. For example, when the first base station may send the first information to the core network element, the first information may be carried in an Uplink RAN Configuration Transfer message. However, when the core network element sends the first information to the second base station, the first information may be carried in a downlink radio access network configuration transfer (Downlink RAN Configuration Transfer) message.

Optionally, the first information may be carried in an existing field or a newly added field in the Downlink RAN Configuration Transfer message. Optionally, the Downlink RAN Configuration Transfer message may further include the information about the second base station. Optionally, the Downlink RAN Configuration Transfer message may further include the information about the first base station. For details, refer to content in S202.

Optionally, there may be one or more core network elements configured to transmit the first information. Therefore, when there are a plurality of core network elements configured to transmit the first information, after receiving the first information sent by the first base station in S202, the core network element may send the first message to another core network element, and the another core network element generates the Downlink RAN Configuration Transfer message and sends the Downlink RAN Configuration Transfer message to the second base station.

S204: The second base station determines, based on the received first information, that the second base station causes atmospheric duct interference to the first base station.

It may be understood that quality of a radio channel between the first base station and the second base station may not be stable in a high-quality state. After determining that the first base station is affected by the atmospheric duct interference from the second base station, if the first base station directly selects the radio channel to send a message to the second base station to notify the second base station that the second base station is interfering with the first base station, it is possible that the second base station cannot successfully receive the message due to unstable radio channel quality. Consequently, the second base station continuously causes atmospheric duct interference to the first base station. In addition, when a distance between the first base station and the second base station is relatively long, there may be no interface between the first base station and the second base station, or the first base station and the second base station do not share a network management system. In this case, it is possible that the first base station cannot send a message to the second base station through an interface or a network management system.

Based on this, in this embodiment, the first base station may send, to the second base station through the core network, the first information that is used to indicate that the first base station is affected by the atmospheric duct interference from the second base station. Specifically, the first information may be transmitted from the first base station to the second base station by using the core network element, to ensure that the second base station can successfully receive the first information, so that the second base station can perform corresponding interference avoidance based on the first information.

It should be noted that there may be one or more core network elements configured to forward the first information. During actual application, if a distance between the first base station and the second base station is relatively long, a plurality of core network elements may be used to forward the first information from the first base station to the second base station. For example, two core network elements, namely, a first core network element and a second core network element are used. The first base station may send the first information to the first core network element, and the first core network element may forward the first information to the second core network element. Further, the second core network element forwards the first information to the second base station. In this way, the first information is forwarded from the first base station to the second base station.

Further, the first core network element may be specifically an access and mobility management function (AMF) network element corresponding to the first base station (referred to as an AMF 1 network element below), and is configured to perform access and mobility management on the first base station, and the second core network element may be specifically an AMF network element corresponding to the second base station (referred to as an AMF 2 network element below), and is configured to perform access and mobility management on the second base station. During actual application, the AMF network element may be an AMF server or the like in the core network. Based on this, in some example implementations of forwarding the first information, the first information may include the identifier of the second base station and the tracking area code (TAC) of the second base station. In this way, after the first base station sends the first information to the first AMF 1 network element, the AMF 1 network element may query a prestored correspondence between a TAC and an AMF network element address based on a TAC carried in the first information, to determine an AMF 2 network element address corresponding to the TAC carried in the first information. Further, the AMF 1 network element sends the first information to the AMF 2 network element based on the address obtained through the query. Then, the AMF 2 network element may send, based on the identifier that is of the second base station and that is carried in the first information, the first information to the second base station corresponding to the identifier. In an example, the first information may be carried in a SON Configuration Transfer field. In this case, the TAC may be specifically located in a selected tracking area indication (Selected TAI) information element in a Target RAN Node ID in the first information, as shown in Table 4. The identifier (gNB ID) of the second base station may be located in a global radio access network node identifier (Global RAN Node ID) field in the Target RAN Node ID, as shown in Table 5.

TABLE 4

| Information element/Group name | Field value |
| --- | --- |
| Target RAN Node ID<br>>Selected TAI<br>>>TAC | Example: 100 |

TABLE 5

| Information element/Group name | Field value |
| --- | --- |
| Target RAN Node ID<br>>Global RAN Node ID<br>>>gNB ID | Example: 1 |

Further, the first information may further carry the identifier of the first base station and the tracking area code of the first base station, so that a source of the first information is determined based on the identifier of the first base station and the tracking area code of the first base station. In this way, the second base station can collect statistics on a base station pair (that is, the first base station and the second base station) where there is mutual atmospheric duct interference when processing an atmospheric duct interference problem, so that the second base station can perform atmospheric duct interference avoidance for the first base station. In an example, the identifier (gNB ID) of the first base station may be located in a Global RAN Node ID field in a Source RAN Node ID (source radio access network node identifier), as shown in Table 6. A tracking area code TAC of the first base station may be located in a TAI (tracking area indication) information element in the Source RAN Node ID, as shown in Table 7.

TABLE 6

| Information element/Group name | Field value |
| --- | --- |
| Source RAN Node ID<br>>Global RAN Node ID<br>>>gNB ID | Example: 2 |

TABLE 7

| Information element/Group name | Field value |
| --- | --- |
| Source RAN Node ID<br>>Selected TAI<br>>>TAC | Example: 200 |

In a further implementation, after determining, based on the received first information, that the second base station causes atmospheric duct interference to the first base station, the second base station may increase duration of a GP symbol (where the GP symbol may be a symbol that is not configured as an uplink symbol or a downlink symbol, and may be referred to as a flexible symbol) between an uplink symbol and a downlink symbol in a signal transmission slot, to perform interference avoidance for the first base station. In an example, before the second base station performs atmospheric duct interference avoidance, there may be three GP symbols between the uplink symbol (representing an uplink signal) and the downlink symbol (representing a downlink signal) in the signal transmission slot of the second base station. In addition, after receiving the first information and determining that the second base station causes the atmospheric duct interference to the first base station, the second base station may increase GP symbols between the uplink symbol and the downlink symbol. For example, the second base station may increase a quantity of GP symbols from 3 to 9, or even 18. In this way, after the GP symbols are increased, a time interval between the uplink signal and the downlink signal becomes larger, and exceeds a delay generated when a downlink signal of the second base station is transmitted to the first base station through an atmospheric duct, so that the downlink signal of the second base station does not fall within a receive window of an uplink signal of the first base station, thereby avoiding atmospheric duct interference caused by the downlink signal of the second base station to the uplink signal of the first base station.

Figure 3:
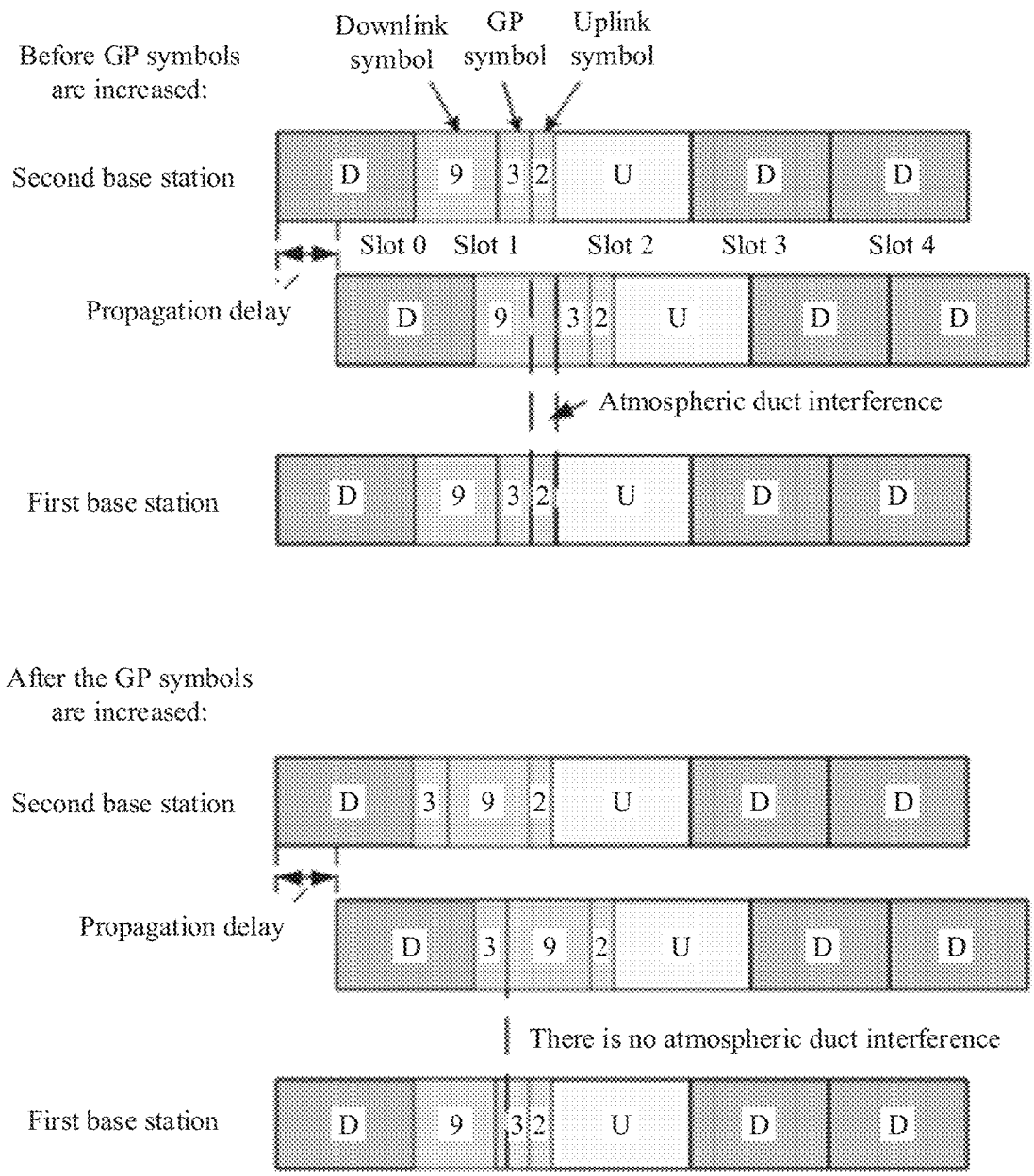
FIG. 3 is a schematic diagram of atmospheric duct interference before and after a GP symbol is added.

In an example implementation, the second base station may specifically increase the GP symbols by reducing a quantity of downlink symbols in the slot. For example, it is assumed that the first base station and the second base station have a same slot configuration. In addition, as shown in FIG. 3, an example in which five slots with a subcarrier frequency of 15 kHz are used. All symbols of the first base station and the second base station in a slot 0 are downlink symbols (that is, the first base station and the second base station perform only downlink signal transmission in the slot, and the downlink symbols are represented by "D" in FIG. 3), all symbols in a slot 2 are uplink symbols, all symbols in a slot 3 and a slot 4 are downlink symbols, and nine downlink symbols, three GP symbols, and two uplink symbols may be successively included in a slot 1. A propagation delay generated due to long-distance transmission exceeds duration of the three GP symbols. Consequently, a downlink symbol of the second base station that is propagated and that arrives at the first base station overlaps an uplink symbol received by the first base station, causing interference to the first base station. Based on this, after the second base station detects that the second base station causes the atmospheric duct interference to the first base station, the second base station may reserve the first three downlink symbols in the slot, and set remaining last six downlink symbols as GP symbols. Therefore, there is a time interval of nine GP symbols between the uplink symbol and the downlink symbol. Correspondingly, information included in the six downlink symbols that are not transmitted may be placed in a next slot, and the second base station sends the information in a downlink symbol in the next slot. After a quantity of GP symbols is increased from 3 to 9, the propagation delay generated due to long-distance transmission is less than duration of the nine GP symbols. In this way, a downlink symbol of the second base station that is propagated and that arrives at the first base station does not overlap an uplink symbol of the first base station, thereby avoiding interference caused by the downlink symbol of the second base station to receiving of the uplink symbol by the first base station. Certainly, the implementation shown in FIG. 3 is merely used as an example for description, and is not intended to limit an implementation of the embodiments of this application. For example, 18 downlink symbols, six GP symbols, and four uplink symbols may be successively included in one slot in five slots with a subcarrier frequency of 30 kHz. In this case, when the GP symbols are increased, some or all of the 18 downlink symbols in the slot may be set as GP symbols, or the like. Alternatively, the second base station may specifically increase the GP symbols by reducing a quantity of uplink symbols in the slot. For example, two uplink symbols in a slot 1 with the subcarrier frequency of 15 kHz are set as GP symbols, or the like. This is not limited in this embodiment of this application.

It may be understood that if the downlink signal of the second base station causes the atmospheric duct interference to receiving of the uplink signal by the first base station, a downlink signal of the first base station usually also causes atmospheric duct interference to receiving of an uplink signal by the second base station. Based on this, in this embodiment, when the first base station sends the first information to the second base station, the first base station may also increase a time interval between an uplink symbol and a downlink symbol that are of the first base station, so that a delay generated when the downlink signal of the first base station is transmitted to the second base station through an atmospheric duct is less than the increased time interval. During specific implementation, similar to the implementation in which the second base station increases the time interval between the uplink symbol and the downlink symbol that are of the second base station, the first base station may increase duration of the GP symbols between the uplink symbol and the downlink symbol by reducing a quantity of downlink symbols or uplink symbols in a slot, to perform interference avoidance for the second base station. For details, refer to the foregoing related content of increasing the GAP symbols in the second base station. Details are not described herein again.

Optionally, a specific setting rule for increasing the GP symbols between the uplink symbol and the downlink symbol by the first base station and/or the second base station may be implemented by predefining a corresponding protocol or pre-configuring the first base station and/or the second base station, or may be determined through joint negotiation of the first base station and the second base station. This is not limited in this embodiment of this application.

It may be understood that, after the second base station performs atmospheric duct interference avoidance, if the first base station still detects that the first base station is affected by atmospheric duct interference from the second base station and receives the identifier of the second base station, the first base station may continue to send the first information to the second base station, so that the second base station continues to increase the time interval between the uplink symbol and the downlink symbol based on the re-received first information, thereby avoiding atmospheric duct interference to the first base station by continuously increasing the GP symbols.

It should be noted that the atmospheric duct between the first base station and the second base station may not exist continuously during actual application. For example, the atmospheric duct dissipates after three or five hours due to a change of a natural environment. Therefore, in a further possible implementation, after the time interval between the uplink signal and the downlink signal is increased by the first base station and the second base station, if preset duration expires, the increased time interval may be reduced to a preset time interval. For example, five hours after the second base station increases the quantity of GP symbols from 3 to 18, the quantity of GP symbols may be restored from 18 to 3. In this case, 15 GP symbols by which the GP symbols are reduced may be restored to downlink symbols, to continue to be used to transmit downlink data.

In this embodiment, because quality of a radio channel between the first base station and the second base station changes easily due to impact of a natural environment, it cannot be ensured that the quality of the radio channel is always in a high-quality state. Therefore, when determining that the first base station is affected by atmospheric duct interference from the second base station, the first base station may notify the second base station in a wired link manner, and specifically, may send, to the second base station through the core network, information used to indicate that the first base station is affected by the atmospheric duct interference from the second base station. It may be understood that the information sent through the core network is not easily affected by the natural environment, so that a change of the natural environment may not affect receiving, by the second base station, of the information sent by the first base station. This can improve a success rate of receiving, by the second base station, a message sent by the first base station. Therefore, the second base station can perform corresponding interference avoidance in time based on the received message, thereby improving a success rate of eliminating the atmospheric duct interference.

Figure 4:
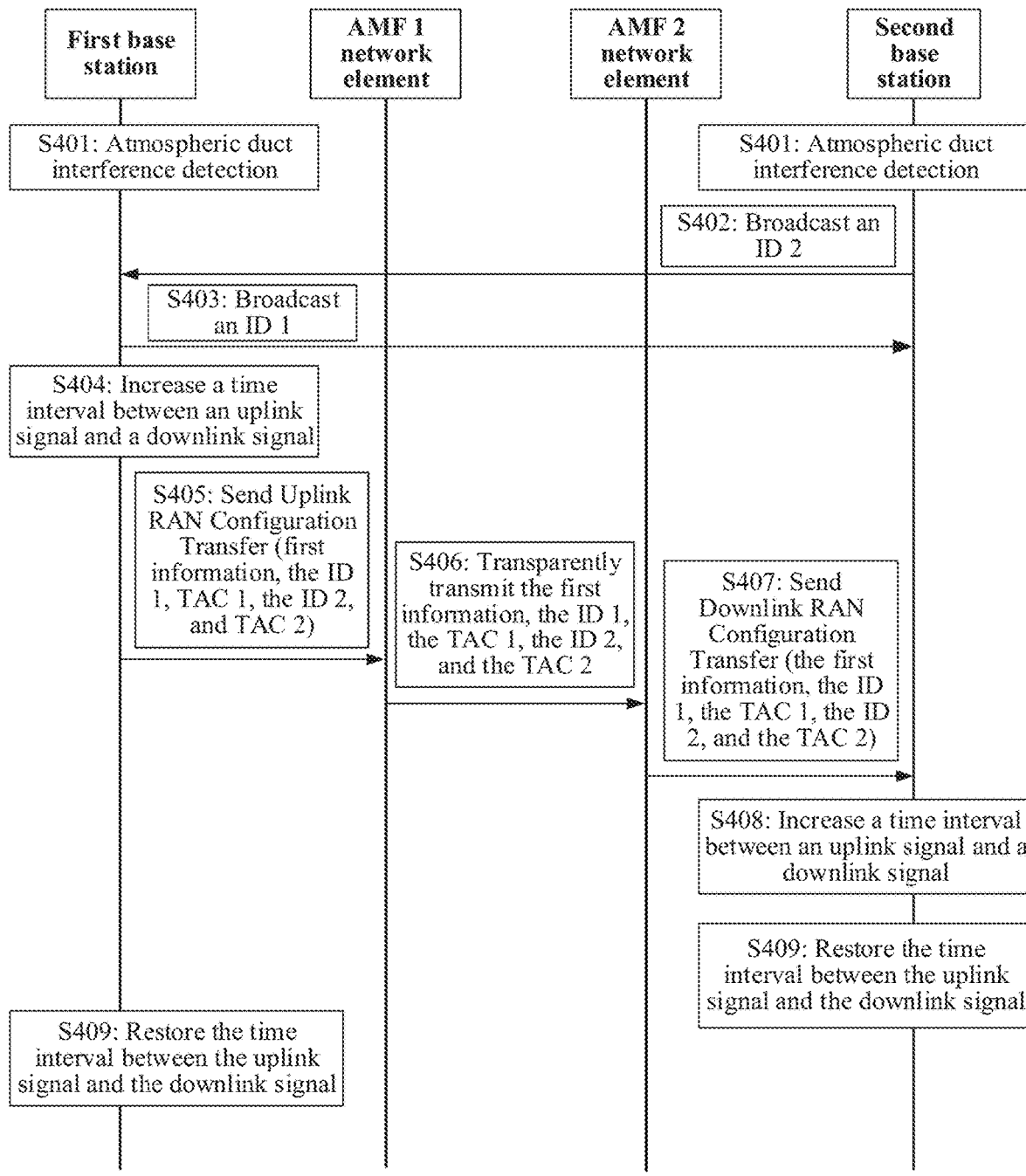
FIG. 4 is a schematic diagram of signaling exchange of another communication method according to an embodiment of this application.

To facilitate understanding of the technical solutions in the embodiments of this application, the following describes the technical solutions in the embodiments of this application in detail with reference to specific application scenarios. In this scenario, the first information sent by the first base station to the second base station through the core network may be carried in the SON Configuration Transfer field, and may be specifically carried in an existing field or a newly added field in the SON Configuration Transfer field. Therefore, the SON Configuration Transfer field may indicate that the first base station is affected by the atmospheric duct interference from the second base station. The core network includes at least the AMF 1 network element that performs access and mobility management on the first base station, and the AMF 2 network element that performs access and mobility management on the second base station. A wired link is used for connection between the first base station and the second base station through the AMF 1 network element and the AMF 2 network element. FIG. 4 is a schematic diagram of signaling exchange of a communication method according to an embodiment of this application. The method may specifically include the following steps.

S401: A first base station and a second base station perform atmospheric duct interference detection.

In this embodiment, if there is atmospheric duct interference between the first base station and the second base station, the first base station may cause atmospheric duct interference to the second base station, and the second base station may also cause atmospheric duct interference to the first base station. Therefore, atmospheric duct detection may be performed by both the first base station and second base station.

If the first base station and the second base station are relatively far away from each other, and an atmospheric duct is not used to transmit a downlink signal of the second base station to the first base station, the downlink signal of the second base station usually does not cause interference to receiving of an uplink signal by the first base station.

S402: After detecting that there is atmospheric duct interference, the second base station broadcasts an identifier ID 2 of the second base station.

It may be understood that, after the second base station detects that the second base station is affected by atmospheric duct interference in a process of receiving an uplink signal, although the second base station currently does not determine a specific base station that causes the atmospheric duct interference to the second base station, the second base station may broadcast the identifier ID 2 of the second base station to another base station, to notify the another base station that the second base station is affected by the atmospheric duct interference. The downlink signal of the second base station may be transmitted in an atmospheric duct between the first base station and the second base station. Therefore, the first base station may also receive the identifier of the second base station broadcast by the second base station, and determine, based on the identifier, a specific base station that is interfering with the first base station currently, or a base station to which a downlink signal of the first base station also causes atmospheric duct interference.

S403. After detecting that there is atmospheric duct interference, the first base station broadcasts an identifier ID 1 of the first base station.

In this embodiment, similar to the second base station, after detecting that the first base station is affected by atmospheric duct interference, the first base station may also broadcast the identifier ID 1 of the first base station to another base station, to notify the another base station that the first base station is affected by the atmospheric duct interference. In this way, the second base station may determine, based on the received ID 1 broadcast by the first base station, that there is atmospheric duct interference between the first base station and the second base station.

S404: If the first base station detects that there is atmospheric duct interference, and receives, through an air interface, the identifier ID 2 of the second base station that is sent by the second base station, the first base station determines that the first base station is interfered with by the second base station, and increases a time interval between receiving of the uplink signal by the first base station and sending of the downlink signal by the first base station.

In this embodiment, the first base station may continuously detect atmospheric duct interference, determine, through detection, that the first base station is interfered with by a downlink signal of another base station when receiving an uplink signal, and at the same time, receive the identifier of the second base station through the air interface. In this case, it may be determined that the first base station is affected by atmospheric duct interference from the second base station. Correspondingly, when the first base station is affected by the atmospheric duct interference from the second base station, a downlink signal of the first base station also causes atmospheric duct interference to receiving of an uplink signal by the second base station. Therefore, in this embodiment, the first base station may increase the time interval between receiving of the uplink signal by the first base station and sending of the downlink signal by the first base station. Specifically, the first base station may increase GP symbols between the uplink symbol and the downlink symbol. For example, a quantity of GP symbols may be increased from 3 to 18.

Optionally, S401 to S404 are optional, and the first base station may detect, in another manner, that the first base station is affected by the atmospheric duct interference from the second base station. This is not limited in this embodiment of this application.

S405: The first base station sends an Uplink RAN Configuration Transfer message to an AMF 1 network element, where a SON Configuration Transfer field of the Uplink RAN Configuration Transfer message carries the foregoing first information, the foregoing identifier ID 1 of the first base station, the foregoing tracking area code TAC 1 of the first base station, the foregoing identifier ID 2 of the second base station, and the foregoing tracking area code TAC 2 of the second base station, and the SON Configuration Transfer field may be used to indicate that the first base station is affected by the atmospheric duct interference from the second base station.

In this embodiment, the SON Configuration Transfer field may include information about the ID 1, TAC 1, ID 2, and TAC 2. In addition, another field in the SON Configuration Transfer field may carry the first information, to indicate that the first base station is affected by the atmospheric duct interference from the second base station.

During specific implementation, indication of atmospheric duct interference may be implemented by redefining a meaning of an existing field in the SON Configuration Transfer field in the Uplink RAN Configuration Transfer message. Alternatively, a new field may be added to the SON Configuration Transfer field, and a meaning of the new field is defined, so that the new field can be used to indicate atmospheric duct interference.

Specifically, when a meaning of an existing field in the SON Configuration Transfer field is redefined to indicate atmospheric duct interference, the existing field may be specifically any one or more fields in fields such as a transport layer address (Transport Layer Address) field, an internet protocol security transport layer address (IP-Sec Transport Layer Address) field, and a general packet radio service tunneling protocol transport layer address (GTP Transport Layer Address) field that are in the SON Configuration Transfer field.

In addition to the existing field in the SON Configuration Transfer field, the new field that is added to the SON Configuration Transfer field may also be used to indicate that the second base station causes atmospheric duct interference to another base station in another possible implementation. In this way, base stations produced by different vendors may interact with each other based on the newly added field defined in the SON Configuration Transfer field. This can avoid a case in which different base stations produced by the different vendors cannot interact with each other due to different field definition manners (including definitions of fields, definitions of field values such as the first value and the second value, and the like) of the different vendors.

For a specific implementation in which the SON Configuration Transfer field is used to indicate that the first base station is affected by the atmospheric duct interference from the second base station, refer to the related description in step S202 in the foregoing embodiment. Details are not described herein again.

The AMF 1 network element is configured to manage the first base station. When communicating with another base station that is relatively far away from the first base station, the first base station may send a communication message to the another base station through the AMF 1 network element.

It should be noted that a sequence of performing step S404 and step S405 is not limited. The schematic diagram of signaling exchange shown in FIG. 4 is merely used as an example to describe this embodiment, but is not used to limit the sequence of performing step S404 and step S405.

S406: The AMF 1 network element transparently transmits the first information, the ID 1, the TAC 1, the ID 2, and the TAC 2 to an AMF 2.

Optionally, the AMF 1 network element may transparently transmit the first information and the information about the ID 1, TAC 1, ID 2, and TAC 2 that are in the Uplink RAN Configuration Transfer message to the AMF 2 based on the TAC 2 in the SON Configuration Transfer field.

It may be understood that different AMF network elements may correspond to different TACs, and are configured to manage base stations in different areas. Therefore, after receiving the SON Configuration Transfer field sent by the first base station, the AMF 1 network element may forward the first information, the ID 1, the TAC 1, the ID 2, and the TAC 2 in the field to the corresponding AMF 2 network element based on the TAC 2 in the field.

S407: The AMF 2 network element sends a Downlink RAN Configuration Transfer message to the second base station based on the ID 2 in the SON Configuration Transfer field.

The AMF 2 network element may be configured to manage the second base station, and store identifiers of managed base stations (including the second base station). Therefore, after receiving the first information, the ID 1, the TAC 1, the ID 2, and the TAC 2 that are transparently transmitted by the AMF 1 network element, the AMF 2 may generate the Downlink RAN Configuration Transfer message for the second base station based on the identifier ID2 of the second base station, and forward the Downlink RAN Configuration Transfer message to the corresponding second base station. The Downlink RAN Configuration Transfer message sent by the AMF 2 network element to the second base station includes the SON Configuration Transfer field.

S408: The second base station determines, based on the Downlink RAN Configuration Transfer message sent by the AMF 2 and/or the ID 1 received through the air interface, that the second base station causes atmospheric duct interference to the first base station, and increases a time interval between receiving of an uplink signal by the second base station and sending of a downlink signal by the second base station.

To prevent the second base station from continuously causing atmospheric duct interference to the first base station, the second base station may increase the time interval between receiving of the uplink signal by the second base station and sending of the downlink signal by the second base station, to avoid atmospheric duct interference caused by the downlink signal of the second base station to receiving of the uplink signal by the first base station.

The ID 1 and the TAC 1 that are included in the SON Configuration Transfer field may help the second base station determine a source of the SON Configuration Transfer field based on the ID 1 and the TAC 1. In this way, when processing an atmospheric duct interference problem, the second base station can collect statistics on a base station pair in which there is atmospheric duct mutual interference.

It should be noted that, in this embodiment, when receiving the ID 1 broadcast by the first base station and/or receiving the Downlink RAN Configuration Transfer message sent by the AMF 2, the second base station may determine that the second base station causes atmospheric duct interference to the first base station. In this way, even if the second base station cannot receive the ID 1 broadcast by the first base station because quality of a radio channel between the first base station and the second base station cannot be stable in a high-quality state, the second base station can still determine, based on the Downlink RAN Configuration Transfer message (specifically, based on the SON Configuration Transfer field in the message) forwarded by the AMF 2 network element, that the second base station causes atmospheric duct interference to the first base station. Therefore, it is ensured that the second base station can avoid atmospheric duct interference caused to the first base station by increasing, in time, the time interval between receiving of the uplink signal by the second base station and sending of the downlink signal by the second base station.

S409: After preset duration, the first base station and the second base station restore respective time intervals between receiving of an uplink signal and sending of a downlink signal.

For example, after the first base station and the second base station increase a quantity of GP symbols between the uplink symbol and the downlink symbol from 3 to 18, if the first base station and the second base station do not detect, after the preset duration, atmospheric duct interference caused by a peer base station to a base station in the first base station and the second base station, the quantity of GP symbols between the uplink symbol and the downlink symbol may be restored from 18 to 3, to improve transmission efficiency of respective downlink data of the first base station and the second base station.

It should be noted that, if the first base station and the second base station still detect atmospheric duct interference from the peer base station after the respective time intervals between an uplink signal and a downlink signal are increased, and continuously receive an identifier of the peer base station, a process of step S302 to step S308 may be repeatedly performed, to further increase the respective time intervals between an uplink signal and a downlink signal of the first base station and the second base station.

It should be noted that step S409 in this embodiment may be optionally performed during actual application, or may not be performed. This embodiment of this application sets no limitation thereto, and is merely used as an optional example for description.

Figure 5:
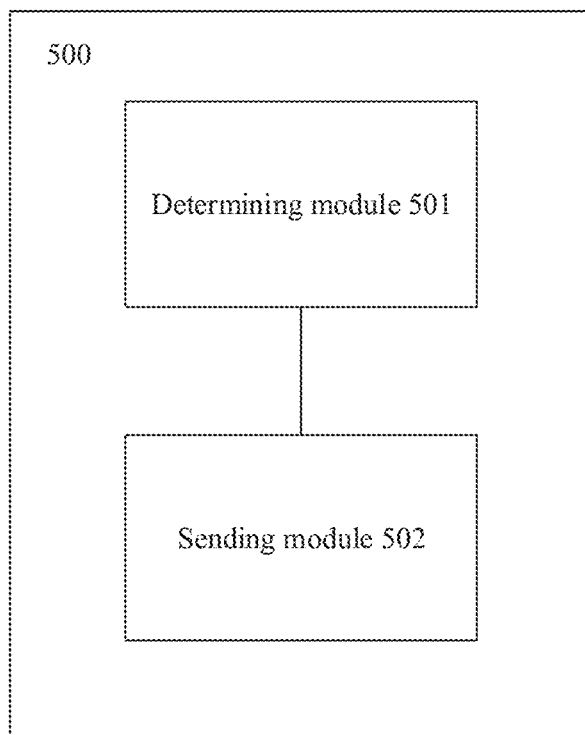
FIG. 5 is a schematic structural diagram of a communications apparatus according to an embodiment of this application.

In addition, the embodiments of this application further provide a communications apparatus. FIG. 5 shows a schematic structural diagram of a communications apparatus according to an embodiment of this application. The apparatus 500 may specifically include:

a determining module 501, configured to determine that the first base station is affected by atmospheric duct interference from a second base station; and a sending module 502, configured to send first information to the second base station through a core network, where the first information is used to indicate that the first base station is affected by the atmospheric duct interference from the second base station.

In some possible implementations, the first information is carried in a target field, and the target field includes at least one or more of the following fields: a transport layer address field, an internet protocol security transport layer address field, and a general packet radio service tunneling protocol transport layer address field.

In some possible implementations, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station.

Alternatively, when the target field includes two or three of the transport layer address field, the internet protocol security transport layer address field, or the general packet radio service tunneling protocol transport layer address field, the first information includes two or three values in a value of the transport layer address field, a value of the internet protocol security transport layer address field, and a value of the general packet radio service tunneling protocol transport layer address field; and the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

In some possible implementations, the first information includes an identifier of the second base station and a tracking area code of the second base station.

In some possible implementations, the identifier of the second base station and the tracking area code of the second base station are used by a network element in the core network to forward the first information to the second base station.

In some possible implementations, the first information further includes an identifier of the first base station and a tracking area code of the first base station.

In some possible implementations, the determining module 501 includes:
- a receiving unit, configured to receive the identifier of the second base station from the second base station through an air interface; and
- a detection unit, configured to detect that a received signal meets an atmospheric duct interference decision condition.

In some possible implementations, the identifier of the second base station is broadcast by the second base station when the second base station detects that a signal received by the second base station is affected by atmospheric duct interference.

It should be noted that, content such as information exchange and an execution process between the modules/units of the foregoing apparatus is based on a same conception as the method embodiment in the embodiments of this application, and brings a technical effect the same as that of the method embodiment in the embodiments of this application. For specific content, refer to the description in the method embodiment shown above in the embodiments of this application, and details are not described herein again.

Figure 6:
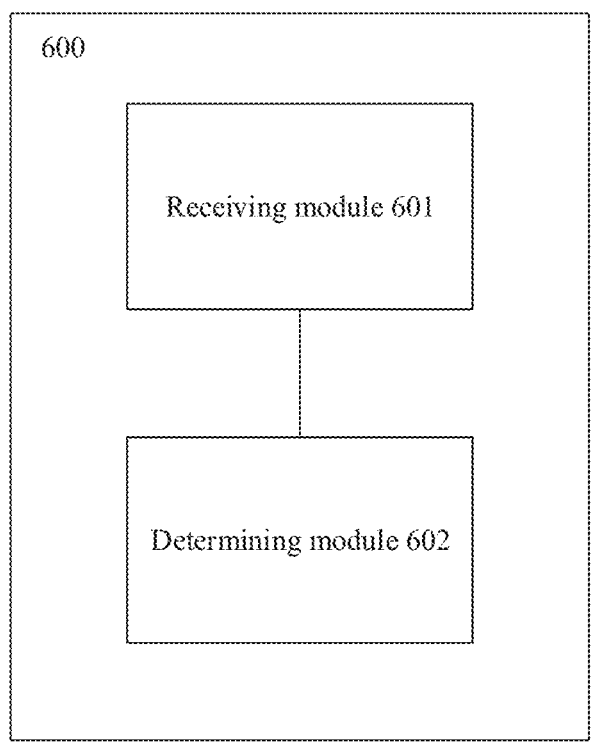
FIG. 6 is a schematic structural diagram of another communications apparatus according to an embodiment of this application.

In addition, the embodiments of this application further provide a communications apparatus. FIG. 6 shows a schematic structural diagram of another communications apparatus according to an embodiment of this application. The apparatus 600 is used in a second base station. The apparatus 600 includes:
- a receiving module 601, configured to receive first information from a first base station, where the first information is used to indicate that the first base station is affected by atmospheric duct interference from the second base station; and
- a determining module 602, configured to determine, based on the first information, that the second base station causes atmospheric duct interference to the first base station.

In some possible implementations, the first information is carried in a target field, and the target field includes at least one of the following fields: a transport layer address field, an internet protocol security transport layer address field, and a general packet radio service tunneling protocol transport layer address field.

In some possible implementations, when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol security transport layer address field, or the value of the general packet radio service tunneling protocol transport layer address field is a first value, and the first value indicates that the first base station is affected by the atmospheric duct interference from the second base station.

Alternatively, when the target field includes two or three of the transport layer address field, the internet protocol security transport layer address field, or the general packet radio service tunneling protocol transport layer address field, the first information includes two or three values in a value of the transport layer address field, a value of the internet protocol security transport layer address field, and a value of the general packet radio service tunneling protocol transport layer address field; and the two or three values in the value of the transport layer address field, the value of the internet protocol security transport layer address field, or the value of the general packet radio service tunneling protocol transport layer address field are each a second value, and the second value indicates that the first base station is affected by the atmospheric duct interference from the second base station.

In some possible implementations, the first information further includes an identifier of the first base station and a tracking area code of the first base station.

In some possible implementations, the first information further includes an identifier of the second base station and a tracking area code of the second base station.

It should be noted that, content such as information exchange and an execution process between the modules/units of the foregoing apparatus is based on a same conception as the method embodiment in the embodiments of this application, and brings a technical effect the same as that of the method embodiment in the embodiments of this application. For specific content, refer to the description in the method embodiment shown above in the embodiments of this application, and details are not described herein again.

Figure 7:
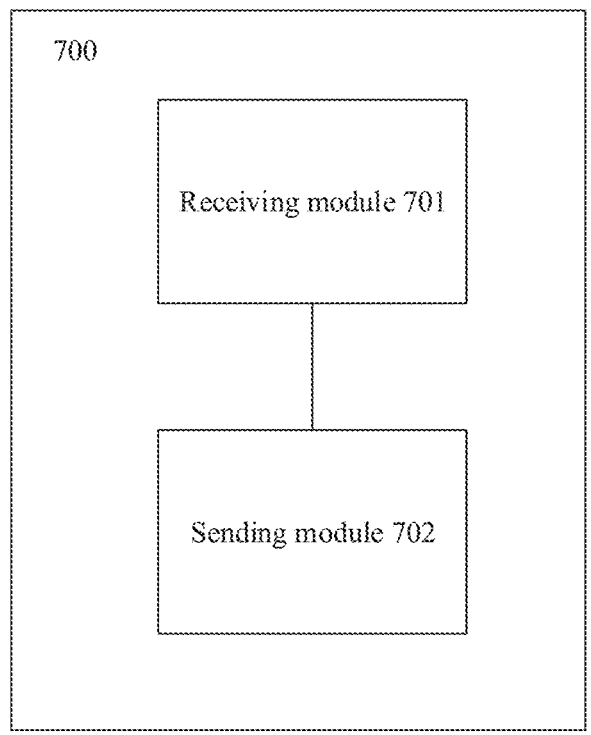
FIG. 7 is a schematic structural diagram of still another communications apparatus according to an embodiment of this application.

In addition, the embodiments of this application further provide a communications apparatus. FIG. 7 shows a schematic structural diagram of still another communications apparatus according to an embodiment of this application. The apparatus 700 is used in a core network element, the apparatus 700 is used in the core network element, and the apparatus includes: a receiving module 701, configured to receive first information from a first base station, where the first information is used to indicate that the first base station is affected by atmospheric duct interference from a second base station; and a sending module 702, configured to send the first information to the second base station.

In some possible implementations, the first information includes an identifier of the second base station and a tracking area code of the second base station; and the sending module 702 is specifically configured to send the first information to the second base station based on the identifier of the second base station and the tracking area code of the second base station.

It should be noted that, content such as information exchange and an execution process between the modules of the foregoing apparatus is based on a same conception as the method embodiment in the embodiments of this application, and brings a technical effect the same as that of the method embodiment in the embodiments of this application. For specific content, refer to the description in the method embodiment shown above in the embodiments of this application, and details are not described herein again.

In addition, an embodiment of this application further provides a communications apparatus. The communications apparatus may be used in the first base station or the second base station mentioned in the foregoing method embodiment. The communications apparatus may include a processor, and the processor is coupled to a memory. The memory is configured to store a computer program or instructions. The processor is configured to execute the computer program or the instructions, so that the communication method performed by the first base station in the foregoing method embodiment is performed, or the communication method performed by the second base station in the foregoing method embodiment is performed.

Figure 8:
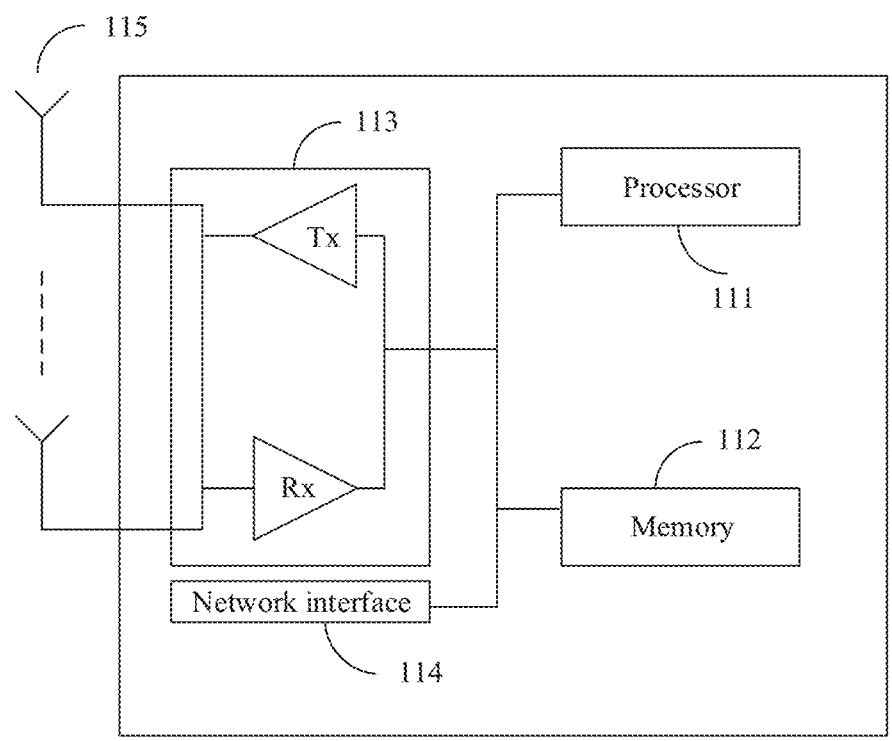
FIG. 8 is a schematic diagram of a hardware structure of a communications apparatus according to an embodiment of this application.

FIG. 8 is a schematic structural diagram of hardware of a communications apparatus. The apparatus may be used in the first base station and the second base station in the embodiments of this application. The communications apparatus includes at least one processor 111, at least one memory 112, at least one transceiver 113, at least one network interface 114, and one or more antennas 115. The processor 111, the memory 112, the transceiver 113, and the network interface 114 are connected, for example, through a bus. In this embodiment of this application, the connection may include various interfaces, transmission lines, buses, or the like, and this is not limited in this embodiment. The antenna 115 is connected to the transceiver 113. The network interface 114 is configured to enable an access network device to connect to another communications device through a communications link. For example, the network interface 114 may include a network interface, for example, an Si interface, between the access network device and a core network element, and the network interface may include a network interface, for example, an X2 or Xn interface, between the access network device and another access network device.

The processor 111 shown in FIG. 8 may specifically complete a processing action of the first base station or the second base station in the foregoing method. The memory 112 may complete a storing action in the foregoing method. The transceiver 113 and the antenna 115 may perform receiving and sending actions on the air interface in the foregoing method, for example, signal sending or signal receiving on the air interface between the first base station and the second base station, or signal sending or signal receiving between the first base station (or the second base station) and the terminal. The network interface 114 may complete an action of interacting with the core network element or the another base station in the foregoing method. An example in which the base station shown in FIG. 8 is the first base station is used below for description.

The processor 111 may determine that the first base station is affected by atmospheric duct interference from the second base station, and may send the first information to the core network element through the network interface 114, so that the core network element sends the first information to the second base station. The memory 112 may store the first information. For specific content of the first information, refer to related descriptions in other embodiments.

Optionally, the first information sent by the processor 111 through the network interface 114 may be carried in a target field. The target field includes at least one or more of the following fields: a transport layer address field, an internet protocol security transport layer address field, and a general packet radio service tunneling protocol transport layer address field.

Optionally, the first information is carried in a first target field, and when the target field includes the transport layer address field, the internet protocol security transport layer address field, or the general packet radio service tunneling protocol transport layer address field, the first information includes a value of the transport layer address field, a value of the internet protocol security transport layer address field, or a value of the general packet radio service tunneling protocol transport layer address field; and the value of the transport layer address field, the value of the internet protocol transport layer address field, or the value of the general packet radio service tunneling protocol transport layer address field is a first value, and the first value indicates that the first base station is affected by the atmospheric duct interference from the second base station; or when the target field includes two or three of the transport layer address field, the internet protocol security transport layer address field, and the general packet radio service tunneling protocol transport layer address field, the first information includes two or three values in a value of the transport layer address field, or a value of the internet protocol security transport layer address field, and a value of the general packet radio service tunneling protocol transport layer address field; and the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

Optionally, the first information may further include an identifier of the second base station and a tracking area code of the second base station.

Optionally, the identifier of the second base station and the tracking area code of the second base station that are included in the first information are used by the core network element to send the first information to the second base station.

Optionally, the first information further includes an identifier of the first base station and a tracking area code of the first base station.

Optionally, the processor 111 may receive the identifier of the second base station through the transceiver 113 and the antenna 115. The processor 111 may receive a signal from a terminal through the transceiver 113 and the antenna 115. Optionally, the processor 111 may detect whether the received signal meets an atmospheric duct interference decision condition.

Optionally, the identifier of the second base station may be broadcast by the second base station when the second base station detects that the signal received by the second base station is affected by atmospheric duct interference. For example, the processor 111 of the second base station may broadcast the identifier of the second base station through the transceiver 113 and the antenna 115.

It should be noted that, when the communications apparatus shown in FIG. 8 is used in the second base station, reference may be made to the foregoing example description, and details are not described herein again.

The processor in the embodiments of this application, for example, the processor 111, may include but is not limited to at least one of the following: a central processing unit (CPU), a microprocessor, a digital signal processor (DSP), a microcontroller unit (MCU), and various types of computing devices, such as an artificial intelligence processor, that run software, where each computing device may include one or more cores configured to execute software instructions to perform an operation or perform processing. The processor may be an independent semiconductor chip, or may be integrated into another circuit to form a semiconductor chip. For example, the processor and another circuit (for example, an encoding/decoding circuit, a hardware acceleration circuit, or various bus and interface circuits) may form an SoC (system-on-a-chip). Alternatively, the processor may be integrated into an ASIC as a built-in processor of the ASIC, and the ASIC integrating the processor may be independently packaged or may be packaged with another circuit. In addition to the core configured to execute software instructions to perform an operation or perform processing, the processor may further include a necessary hardware accelerator, for example, a field programmable gate array (FPGA), a PLD (programmable logic device), or a logic circuit that implements a dedicated logic operation.

The memory in the embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 112 may exist independently and is connected to the processor 111. Optionally, the memory 112 and the processor 111 may be integrated together, for example, integrated in a chip. The memory 112 can store program code that executes the technical solutions in the embodiments of this application, and the processor 111 controls execution of the program code. Various types of computer program code that are executed may also be considered as drivers of the processor 111. For example, the processor 111 is configured to execute the computer program code stored in the memory 112, to implement the technical solutions in the embodiments of this application.

The transceiver 113 may be configured to support receiving or sending of a radio frequency signal between the access network device and the terminal, and the transceiver 113 may be connected to the antenna 115. The transceiver 113 includes a transmitter Tx and a receiver Rx. Specifically, the one or more antennas 115 may receive the radio frequency signal. The receiver Rx of the transceiver 113 is configured to: receive the radio frequency signal from the antenna, convert the radio frequency signal into a digital baseband signal or a digital intermediate frequency signal, and provide the digital baseband signal or the digital intermediate frequency signal for the processor 111, so that the processor 111 further processes the digital baseband signal or the digital intermediate frequency signal, for example, performs demodulation processing and decoding processing. In addition, the transmitter Tx of the transceiver 113 is further configured to: receive a modulated digital baseband signal or digital intermediate frequency signal from the processor 111, convert the modulated digital baseband signal or digital intermediate frequency signal into a radio frequency signal, and send the radio frequency signal through the one or more antennas 115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Figure 9:
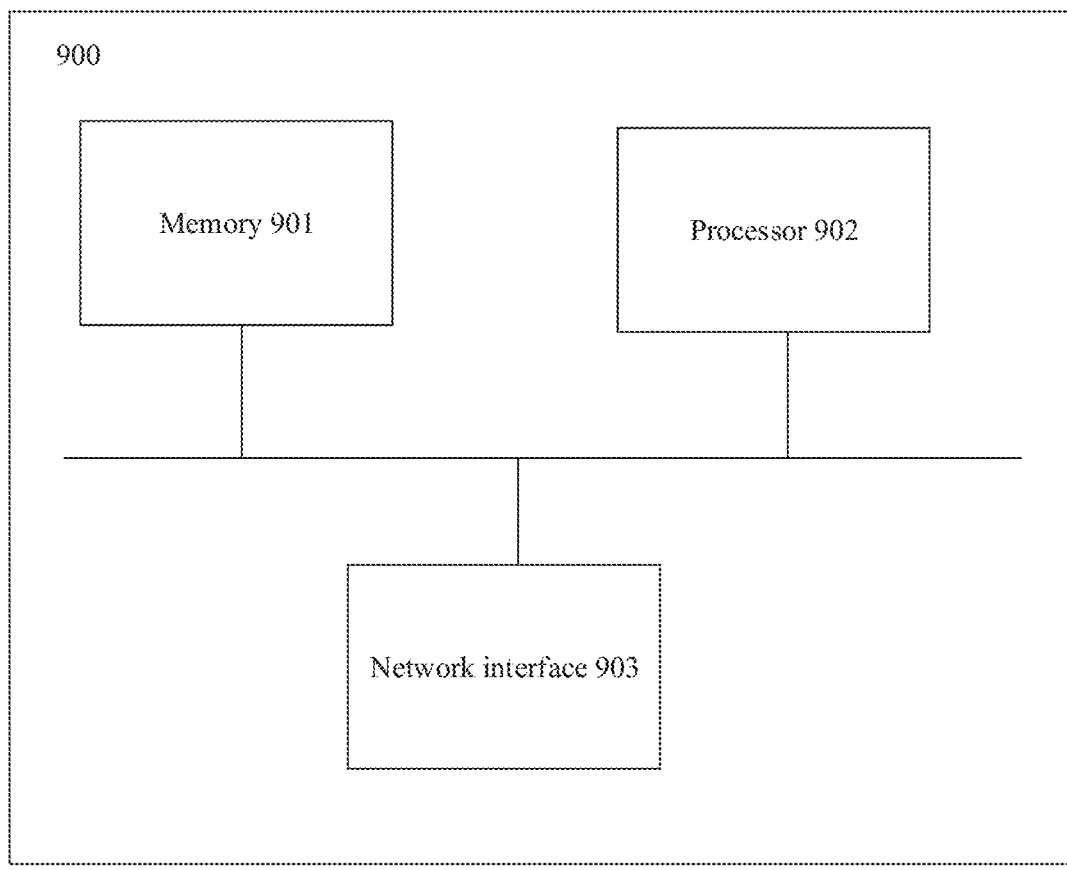
FIG. 9 is a schematic diagram of a hardware structure of another communications apparatus according to an embodiment of this application.

In addition, an embodiment of this application further provides another communications apparatus. As shown in FIG. 9, the communications apparatus 900 may be used in a core network element, and may include a processor 902. The processor 902 is coupled to a memory 901, and the processor 902 is coupled to a network interface 903, so that the core network element 900 can transfer information with another base station through the network interface 903. The memory 901 is configured to store a computer program or instructions. The processor 902 is configured to execute the computer program or the instructions, so that the communication method performed by the core network element in the foregoing method embodiment is performed. For example, the processor 902 may receive first information from a first base station through the network interface 903, where the first information is used to indicate that the first base station is affected by atmospheric duct interference from a second base station, and the processor 902 may send the first information to the second base station through the network interface 903.

Figure 10:
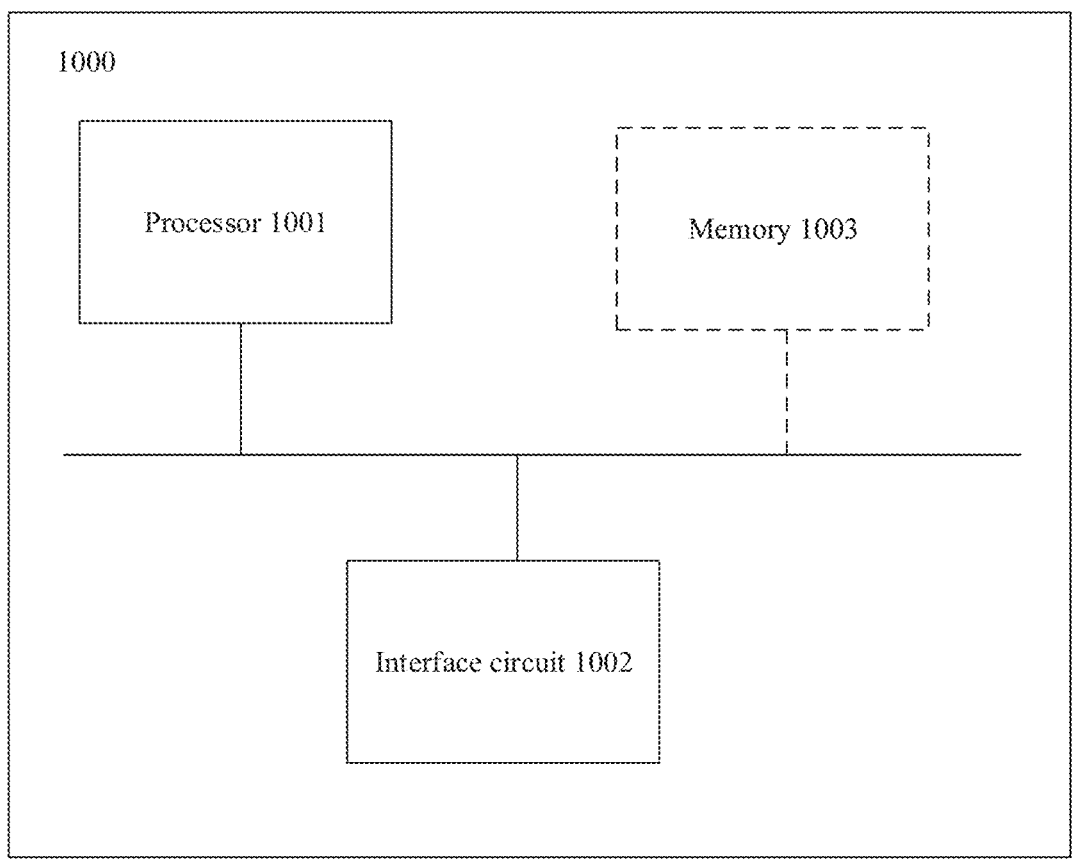
FIG. 10 is a schematic diagram of a hardware structure of a chip according to an embodiment of this application.

In addition, an embodiment of this application further provides a chip. As shown in FIG. 10, the chip 1000 may include a processor 1001 and an interface circuit 1002.

Further, the chip 1000 may further include a memory 1003. It should be noted that the chip 1000 may be used in the first base station, the second base station, or the core network element. That the chip 1000 is used in the first base station is used as an example. The processor 1001 on the chip 1000 may complete an action of the first base station in the foregoing method. The interface circuit 1002 may complete signal sending or receiving between the chip 1000 and another component or device, and the interface circuit 1002 and the another component or device may cooperate to complete an action of interacting with the second base station or the core network element in the foregoing method. The memory 1003 may complete a storing action in the foregoing method. An example is provided for description below.

The processor 1001 may determine that the first base station is affected by the atmospheric duct interference from the second base station, and the interface circuit 1002 sends the first information to the core network element, so that the core network element sends the first information to the second base station. The memory 1003 may store the first information. For specific content of the first information, refer to related descriptions in other embodiments.

It should be noted that, when the chip shown in FIG. 10 is used in the second base station or the core network element, reference may be made to the foregoing example description, and details are not described herein again.

In the foregoing embodiments, the instructions that are stored in the memory and that are to be performed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communications medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage device or another magnetic storage device, or any other medium that is used to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the computer program instructions are loaded and executed on a computer, the procedures or functions described in the foregoing method embodiments are all or partially generated. The computer may be a general-purpose computer, a dedicated computer, a computer network, a base station, a terminal, or another programmable apparatus.

It should be noted that, consistent meanings are expressed when differences are not emphasized.

It should be noted that, in the embodiments of this application, the word "example", "for example", or the like is used to represent giving an example, an illustration, or a description. Any embodiment or design solution described by using "example" or "for example" in the embodiments of this application shall not be construed as being more preferred or more advantageous than another embodiment or design solution. Exactly, use of words such as "example" or "for example" is intended to present a related concept in a specific manner.

In this application, "at least one" refers to one or more. A plurality refers to two or more than two. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same or similar items whose functions and purposes are basically the same. A person skilled in the art may understand that terms such as "first" and "second" do not limit a quantity or an execution sequence, and terms such as "first" and "second" do not indicate a definite difference.

A network architecture and a service scenario that are described in the embodiments of this application are intended to describe the technical solutions of the embodiments of this application more clearly, but do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

What is claimed is:

1. A communication apparatus for a first base station, the communication apparatus comprising:
at least one processor; and
a memory coupled to the at least one processor and storing programming instructions for execution by the at least one processor, wherein the programming instructions instruct the at least one processor to perform operations comprising:
determining that the first base station is affected by atmospheric duct interference from a second base station; and
sending first information to the second base station through a core network, wherein the first information is used to indicate that the first base station is affected by the atmospheric duct interference from the second base station;
wherein the first information is carried in a target field; and
wherein the target field comprises one or more of the following fields: a transport layer address field, an internet protocol security transport layer address field, or a general packet radio service tunneling protocol transport layer address field.

2. The communication apparatus according to claim 1, wherein the target field comprises one of the transport layer address field, the internet protocol security transport layer address field, or the general packet radio service tunneling protocol transport layer address field;
wherein the first information comprises a single value of a value of the transport layer address field, a value of the internet protocol security transport layer address field, or a value of the general packet radio service tunneling protocol transport layer address field; and
wherein the single value is a first value, and the first value indicates that the first base station is affected by the atmospheric duct interference from the second base station.

3. The communication apparatus according to claim 1, wherein the first information further comprises an identifier of the second base station and a tracking area code of the second base station.

4. The communication apparatus according to claim 3, wherein the identifier of the second base station and the tracking area code of the second base station are used by a network element in the core network to send the first information to the second base station.

5. The communication apparatus according to claim 1, wherein the first information further comprises an identifier of the first base station and a tracking area code of the first base station.

6. The communication apparatus according to claim 1, wherein the instructions that cause determining that the first base station is affected by atmospheric duct interference from the second base station include instructions that cause the communication apparatus to:
receive an identifier of the second base station from the second base station through an air interface; and
detect that a received signal meets an atmospheric duct interference decision condition.

7. The communication apparatus according to claim 6, wherein the identifier of the second base station is broadcast by the second base station in response to the second base station detecting that a signal received by the second base station is affected by atmospheric duct interference.

8. The communication apparatus according to claim 1, wherein the target field comprises two or three of the transport layer address field, the internet protocol security transport layer address field, and the general packet radio service tunneling protocol transport layer address field;
wherein the first information comprises two or three values in a value of the transport layer address field, a value of the internet protocol security transport layer address field, and a value of the general packet radio service tunneling protocol transport layer address field; and
wherein the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

9. A communication apparatus for a second base station, the communication apparatus comprising:
at least one processor; and
a memory coupled to the at least one processor and storing programming instructions for execution by the at least one processor, wherein the programming instructions instruct the at least one processor to perform operations comprising:
receiving first information from a first base station, wherein the first information is used to indicate that the first base station is affected by atmospheric duct interference from the second base station; and
confirming, based on the first information, that the second base station causes the atmospheric duct interference to the first base station;
wherein the first information is carried in a target field; and
wherein the target field comprises one of the following fields: a transport layer address field, an internet protocol security transport layer address field, or a general packet radio service tunneling protocol transport layer address field.

10. The communication apparatus according to claim 9, wherein the target field comprises one of the transport layer address field, the internet protocol security transport layer address field, or the general packet radio service tunneling protocol transport layer address field;
wherein the first information comprises a single value of a value of the transport layer address field, a value of the internet protocol security transport layer address field, or a value of the general packet radio service tunneling protocol transport layer address field; and wherein the single value is a first value, and the first value indicates that the first base station is affected by the atmospheric duct interference from the second base station.

11. The communication apparatus according to claim 9, wherein the first information further comprises an identifier of the first base station and a tracking area code of the first base station.

12. The communication apparatus according to claim 9, wherein the first information further comprises an identifier of the second base station and a tracking area code of the second base station.

13. The communication apparatus according to claim 9, wherein the target field comprises two or three of the transport layer address field, the internet protocol security transport layer address field, or the general packet radio service tunneling protocol transport layer address field;

wherein the first information comprises two or three values in a value of the transport layer address field, a value of the internet protocol security transport layer address field, and a value of the general packet radio service tunneling protocol transport layer address field; and wherein the two or three values in the value of the transport layer address field, the value of the internet protocol security transport layer address field, and the value of the general packet radio service tunneling protocol transport layer address field are each a second value, and the second value indicates that the first base station is affected by the atmospheric duct interference from the second base station.

14. A communication apparatus for a core network element, the communication apparatus comprising:
at least one processor; and
a memory coupled to the at least one processor and storing programming instructions for execution by the at least one processor, wherein the programming instructions instruct the at least one processor to perform operations comprising:
  receiving first information from a first base station, wherein the first information is used to indicate that the first base station is affected by atmospheric duct interference from a second base station, and wherein the first information comprises an identifier of the second base station and a tracking area code of the second base station; and
  sending the first information to the second base station based on the identifier of the second base station and the tracking area code of the second base station.

* * * * *